(12) United States Patent
Iwazaki

(10) Patent No.: US 7,786,446 B2
(45) Date of Patent: *Aug. 31, 2010

(54) RADIATION DETECTOR

(75) Inventor: Nobuyuki Iwazaki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,344

(22) Filed: Jul. 21, 2008

(65) Prior Publication Data

US 2009/0026381 A1 Jan. 29, 2009

(30) Foreign Application Priority Data

Jul. 27, 2007 (JP) ............................. 2007-196524

(51) Int. Cl.
*G01T 1/24* (2006.01)
(52) U.S. Cl. .............................................. 250/370.09
(58) Field of Classification Search ................ 250/580, 250/591, 370.09
See application file for complete search history.

(56) References Cited

U.S. PATENT DOCUMENTS

| 5,563,421 | A | 10/1996 | Lee et al. | |
|---|---|---|---|---|
| 7,112,776 | B2 * | 9/2006 | Iwakiri | 250/208.1 |
| 7,112,800 | B2 * | 9/2006 | Sato et al. | 250/370.09 |
| 2006/0033031 | A1 * | 2/2006 | Takeda et al. | 250/370.11 |
| 2008/0237770 | A1 * | 10/2008 | Iwazaki | 257/448 |

FOREIGN PATENT DOCUMENTS

| JP | 9009153 A | 1/1997 |
|---|---|---|
| JP | A 2005-086059 | 3/2005 |
| JP | A 2005-286183 | 10/2005 |

* cited by examiner

*Primary Examiner*—Constantine Hannaher
(74) *Attorney, Agent, or Firm*—Chad M. Herring; Sheldon J. Moss

(57) ABSTRACT

An extended electrode is electrically connected to a conductor in a portion outside of an inner wall of a protection member disposed on a photoconductive layer side, the pressure applied to the photoconductive layer is reduced and the deterioration of the photoconductive layer may be suppressed. Further, since the extended electrode is electrically connected to a high-voltage wire in a portion outside of the inner wall of the protection member, the extended electrode may be connected to the high-voltage wire in the state that the photoconductive layer is surrounded by the protection member. As a result, deterioration of the photoconductive layer may be suppressed even while a connection work is performed.

5 Claims, 16 Drawing Sheets

FIG. 6

| Name of substance | | | Insulation breakdown strength |
|---|---|---|---|
| Symbol | Name | Grade | KV/mm |
| PC | Polycarbonate | N | 30 |
| PET | Polyethylene terephthalate | N | 60 |
| PMMA | Polymethylmethacrylate (acryl) | N | 20 |
| PVC | Polyvinyl chloride | N | 26 |

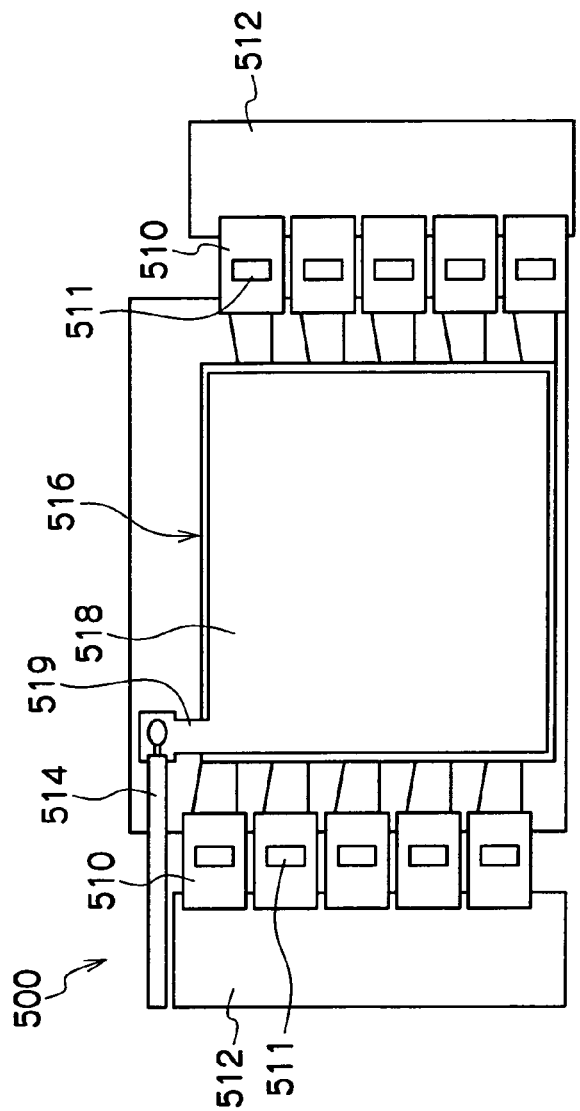
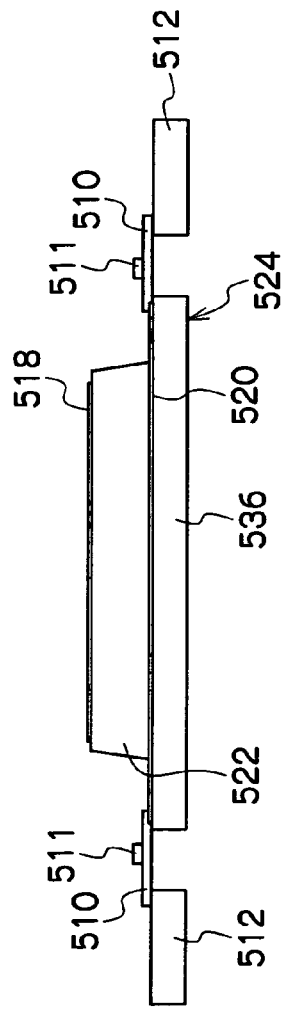
FIG. 10A
FIG. 10B

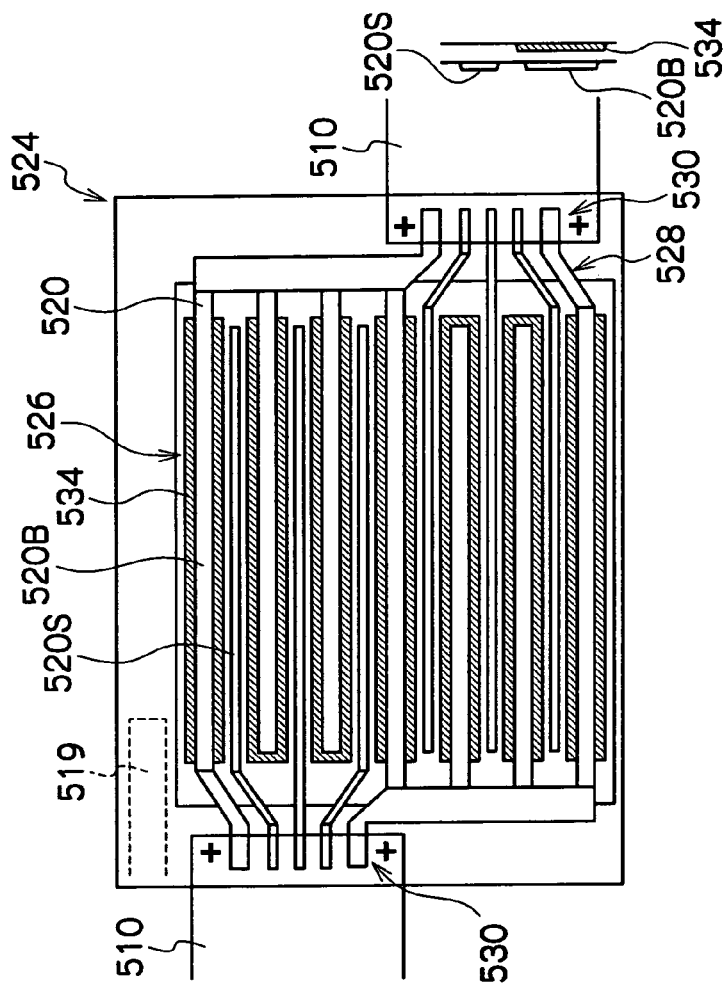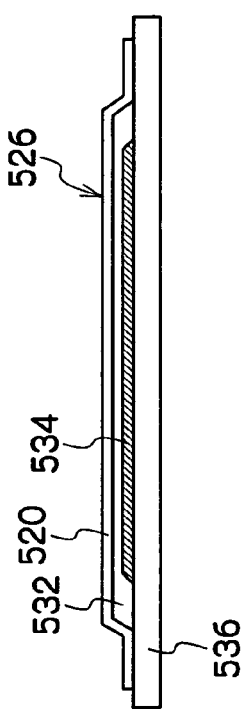
FIG. 11A
FIG. 11B

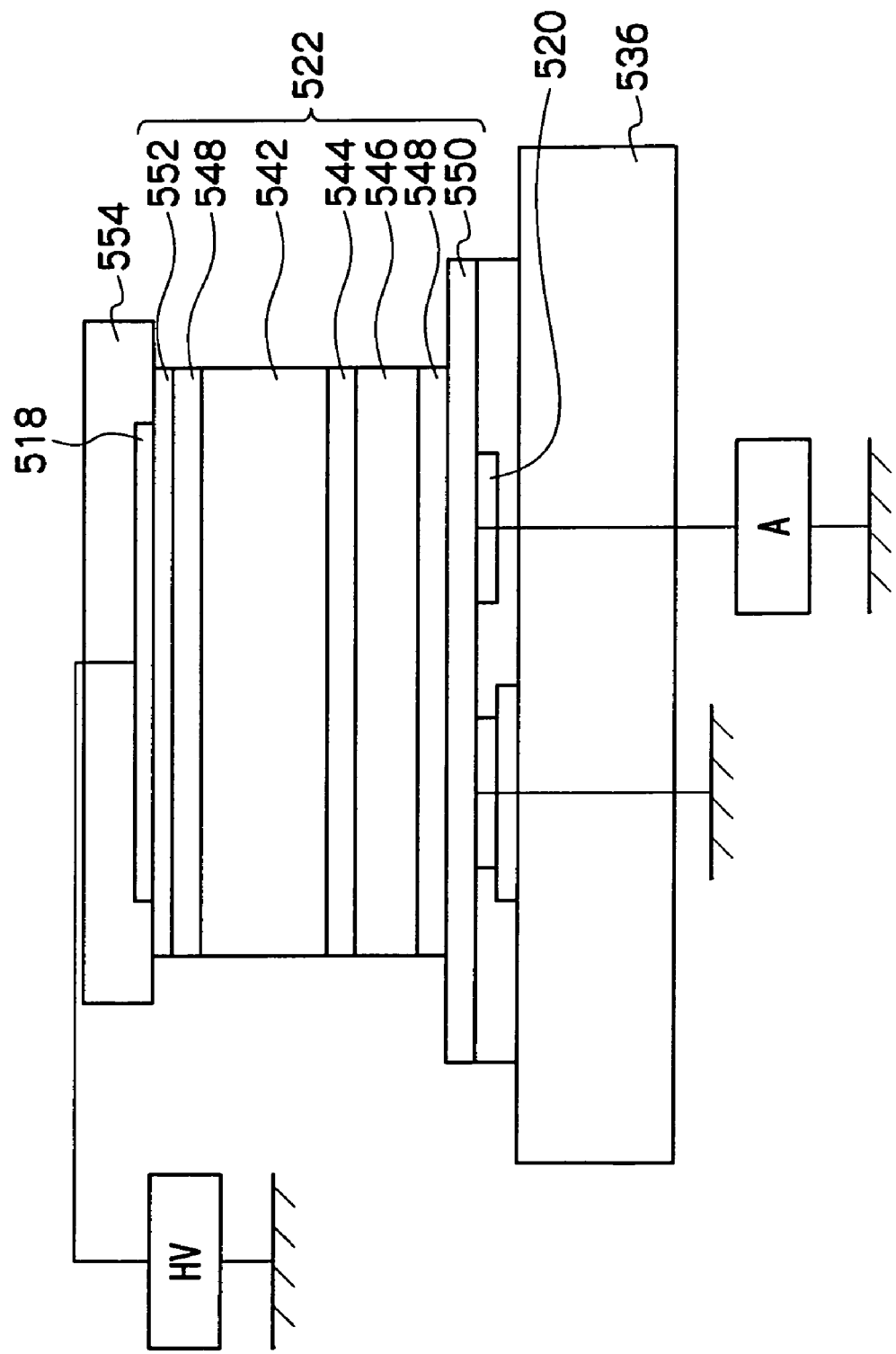

RADIATION DETECTOR

CROSS-REFERENCE TO RELATED APPLICATION

This application claims priority under 35 USC 119 from Japanese Patent Application, No. 2007-196524, the disclosure of which is incorporated by reference herein.

BACKGROUND OF THE INVENTION

Technical Field

The present invention relates to a radiation detector used in a medical radiographic apparatus.

There are known, as a radiation detector, an indirect conversion type radiation detector, by which, after radiation such as X-rays is converted into light first, the converted light is further converted into an electric signal by photoelectric conversion, and a direct conversion type radiation detector by which incident radiation is converted into an electric signal immediately by a charge conversion layer.

The radiation detectors disclosed, for example, in Japanese Patent Application Laid-Open (JP-A) Nos. 2005-86059 and 2005-286183 are known. In the respective radiation detectors, an upper electrode is formed on a charge conversion layer formed of amorphous selenium, a high-voltage wire pulled in from the outside is pulled up to the upper electrode and connected to the upper electrode above the charge conversion layer.

SUMMARY

However, in the above arrangement, there is a possibility that the charge conversion layer is deteriorated because it is pressed or damaged by scratches formed thereto by a working tool, which comes into contact with the charge conversion layer, in a connection work of the high-voltage wire to the upper electrode when an apparatus is manufactured.

Further, the high-voltage wire disposed on the charge conversion layer may press the charge conversion layer depending on the state in which they are used. It is considered that due to being pressed by the high-voltage wire, the amorphous selenium of the charge conversion layer is deteriorated by being crystallized to thereby lower the detection accuracy of radiation.

In view of the above fact, the present invention provides a radiation detector capable of suppressing deterioration of a charge conversion layer.

A radiation detector of an aspect of the invention includes a charge conversion layer generating charges in response to radiation incident thereon, a substrate disposed under the charge conversion layer and having a lower electrode for collecting the charges generated by the charge conversion layer, a protection member standing on the outer periphery of the substrate and surrounding the charge conversion layer, an upper electrode laminated on the charge conversion layer for applying a bias voltage to the charge conversion layer, an extended electrode extending from the upper electrode to a portion outside of the inner wall of the protection member located on the charge conversion layer side when viewed in a cross section, and a conductor electrically connected to the extended electrode in the portion outside of the inner wall for applying a bias voltage from the extended electrode to the charge conversion layer through the upper electrode.

BRIEF DESCRIPTION OF THE DRAWINGS

FIG. 6 is a table showing an example of resin used in a protection member;

FIGS. 10A and 10B are respectively a view showing a schematic arrangement of a radiation detecting substrate as a radiation detector using an optical reading system;

FIGS. 11A and 11B are respectively a view showing a schematic structure of a lower radiation detecting substrate of the radiation detecting substrate shown in FIGS. 10A and 10B;

FIG. 12 is a schematic view schematically showing an arrangement of the radiation detecting substrate shown in FIGS. 10A and 10B;

DETAILED DESCRIPTION OF THE INVENTION

An exemplary embodiment of a radiation detector according to the present invention will be explained below based on drawings.

The radiation detector according to the exemplary embodiment is used in an radiographic apparatus, has an electrostatic recording unit including a photoconductive layer which exhibits conductivity when it is radiated with radiation, records image information when it is radiated with radiation carrying the image information, and outputs an image signal showing the recorded image information.

The radiation detector includes a radiation detector using a so-called optical reading system using a semiconductor material for generating charges in response to radiation of light, a radiation detector using an electric reading system which accumulates the charges generated by irradiation and detects the accumulated charges by turning on and off the pixels of an electric switch such as thin film transistor (TFT), charge coupled device (CCD), or complementary metal oxide semiconductor (CMOS) sensor one by one.

(Configuration of Radiation Detector Using Electric Reading System)

Figure 1:
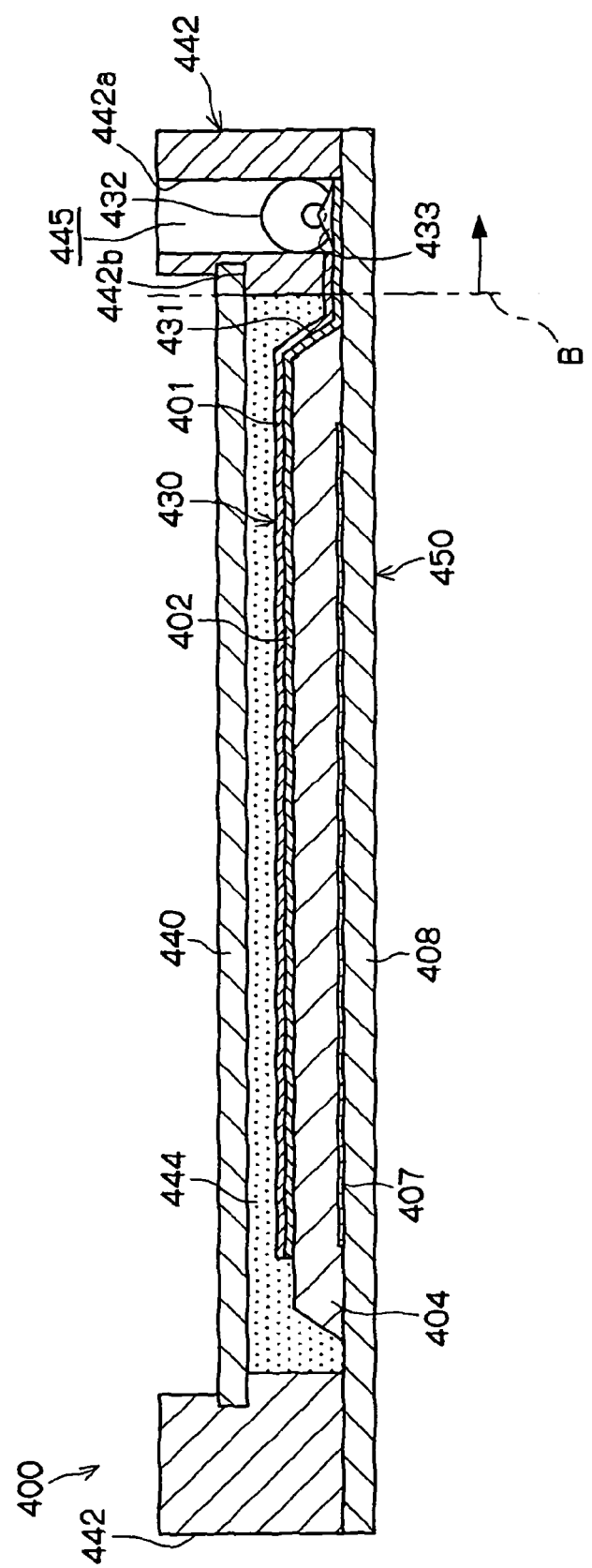
FIG. 1 is a schematic view showing an overall arrangement of a radiation detector using an electric reading system.
Figure 2:
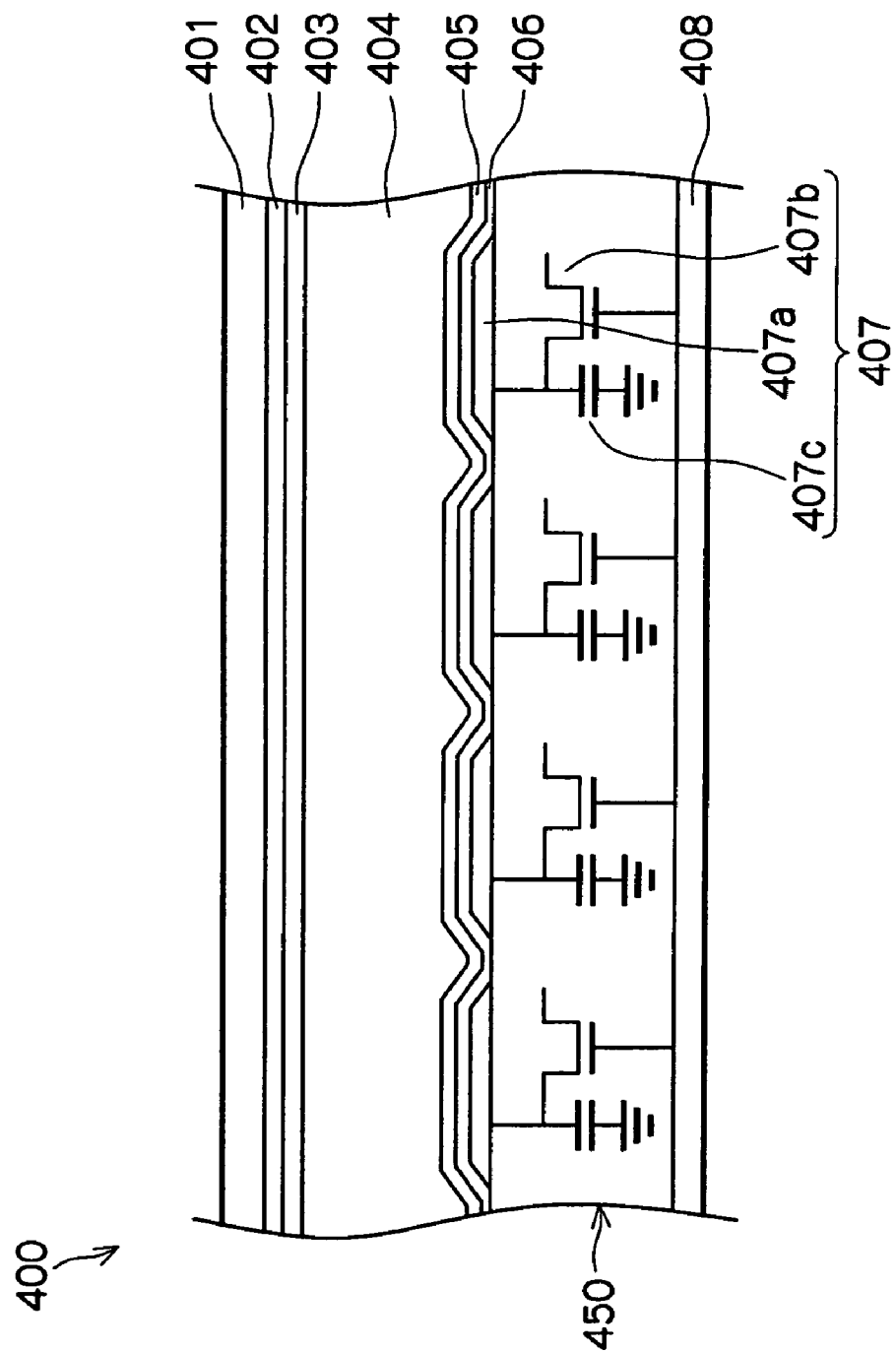
FIG. 2 is a schematic arrangement view showing a main portion of the detector using the electric reading system.

First, a radiation detector using an electric reading system will be explained. FIG. 1 is a schematic view showing an overall arrangement of the radiation detector using the electric reading system. FIG. 2 is a view showing a main configuration of the radiation detector and shows the respective portions layered on a glass substrate.

As shown in FIGS. 1 and 2, the radiation detector 400 according to the exemplary embodiment includes a photoconductive layer 404 exhibiting electromagnetic conductivity as a charge conversion layer for generating charges when X-rays are incident thereon as radiation. An amorphous material, which has a high dark resistance, exhibits good electromagnetic conductivity to radiation of X-rays, and may be formed in a film having a large area at a low temperature by a vacuum vapor deposition method, is preferably used as the photoconductive layer 404, and an amorphous Se (a-Se) film is used as the photoconductive layer 404. Further, since a material composed of amorphous Se doped with As, Sb, Ge is excellent in heat stability, such material is preferable to the photoconductive layer 404.

A single bias electrode 401 is layered on the photoconductive layer 404 as an upper electrode for applying a bias voltage to the photoconductive layer 404. An electrode layer 430 is composed of the bias electrode 401 and an extended electrode 431 to be described later. Gold (Au), for example, is used for the bias electrode 401.

Plural charge collection electrodes 407a are formed under the photoconductive layer 404 as a lower electrode. As shown in FIG. 2, each of the charge collection electrodes 407a is connected to a charge accumulation capacitance 407c and a switch device 407b.

Further, an intermediate layer is formed between the photoconductive layer 404 and the bias electrode 401. The intermediate layer is a layer existing between the upper electrode and the charge conversion layer and may act also as a charge injection blocking layer (which includes accumulation of charges and formation of a diode). Although a resistor layer and an insulation layer may be used as the charge injection blocking layer, a hole injection blocking layer, which blocks injection of holes but it acts a conductor to electrons, and an electron injection blocking layer, which blocks injection of electrons but it acts a conductor to holes, are preferably used as the charge injection blocking layer. $CeO_2$, ZnS, and $Sb_2S_3$ may be used as the hole injection blocking layer. ZnS is preferably used because it may be formed at a low temperature. Se, CdTe, which are doped with $Sb_2S_3$, CdS, Te and organic compounds may be used as the electron injection blocking layer. Note that $Sb_2S_3$ may be used as the hole injection blocking layer and the electron injection blocking layer depending on the thickness thereof. In the exemplary embodiment, since the bias electrode is a positive polarity, a hole injection blocking layer 402 is formed as the intermediate layer. Further, an electron injection blocking layer 406 is formed between the photoconductive layer 404 and the charge collection electrodes 407a although it is not the intermediate layer of the invention.

Further, crystallization prevention layers 403 and 405 are disposed between the hole injection blocking layer 402 and the photoconductive layer 404 and between the electron injection blocking layer 406 and the photoconductive layer 404, respectively. GeSe, $GeSe_2$, $Sb_2Se_3$, and $a\text{-}As_2Se_3$, Se—As, Se—Ge, Se—Sb compounds may be used as the crystallization prevention layers 403 and 405.

Note that an active matrix layer 407 is formed with the charge collection electrodes 407a, the switch device 407b, and the charge accumulation capacitance 407c, and an active matrix substrate 450 is composed of a glass substrate 408 and the active matrix layer 407.

Figure 3:
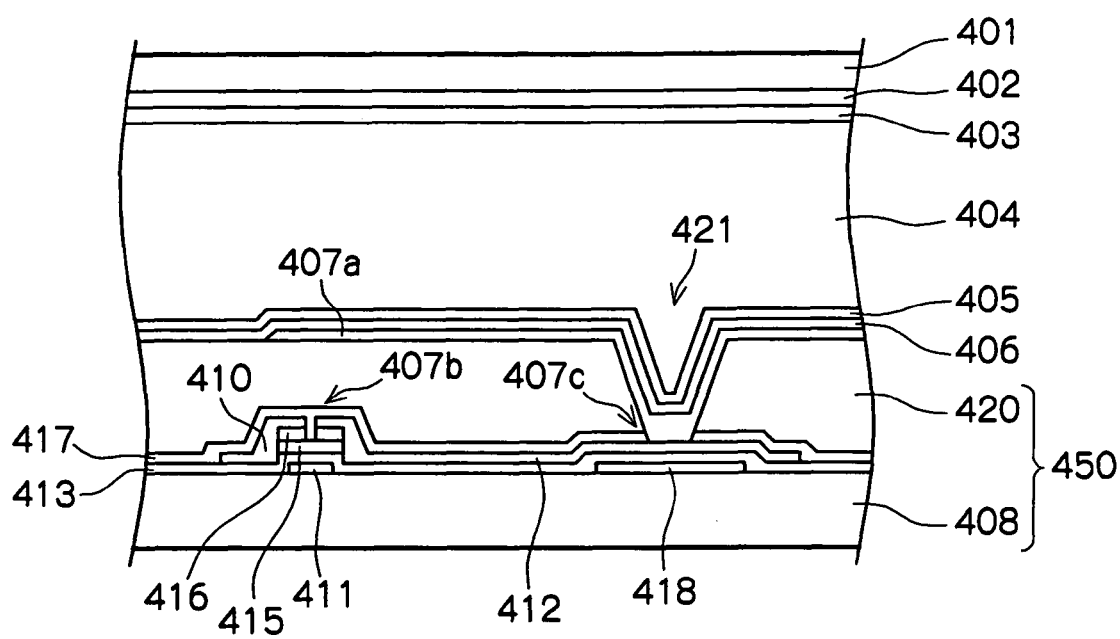
FIG. 3 is a sectional view showing a structure of one pixel unit of the detector using the electric reading system.
Figure 4:
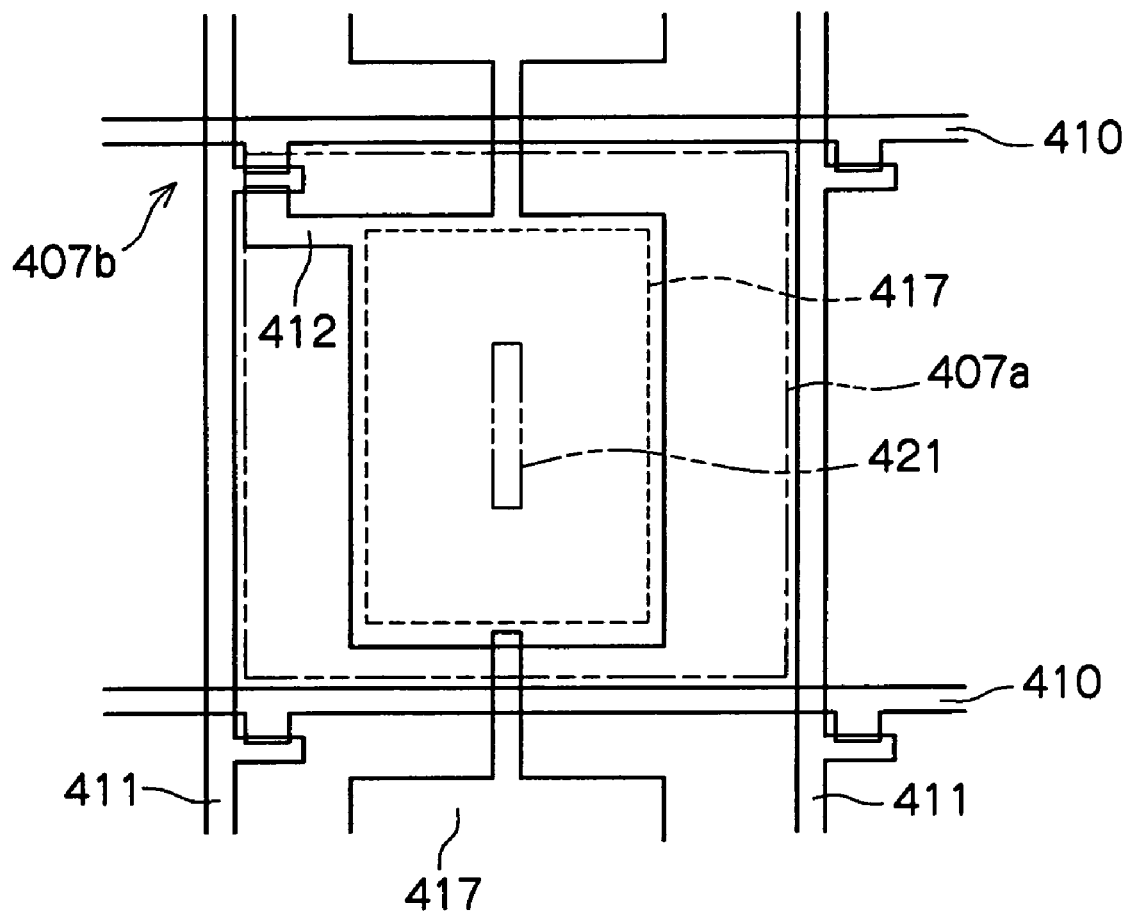
FIG. 4 is a plan view showing the structure of the one pixel unit of the radiation detector using the electric reading system.

FIG. 3 is a sectional view showing a structure of one pixel unit of the radiation detector 400, and FIG. 4 is a plan view thereof. The size of one pixel shown in FIGS. 3 and 4 is about 0.1 mm×0.1 mm to about 0.3 mm×0.3 mm, and the overall radiation detector is composed of about 500×500 to about 3000×3000 pieces of the pixels disposed in a matrix configuration.

As shown in FIG. 3, the active matrix substrate 450 includes the glass substrate 408, a gate electrode 411, a charge accumulation capacitance electrode (hereinafter, referred to as Cs electrode) 418, a gate insulation film 413, drain electrodes 412, a channel layer 415, a contact electrode 416, a source electrode 410, an insulation protection film 417, an interlayer insulation film 420, and the charge collection electrodes 407a.

Further, the switch device 407b is composed of a thin film transistor (TFT) formed of the gate electrode 411, the gate insulation film 413, the source electrode 410, the drain electrode 412, the channel layer 415, the contact electrode 416 and so on. The charge accumulation capacitance 407c is composed of the Cs electrode 418, the gate insulation film 413, the drain electrode 412 and so on.

The glass substrate 408 is a support substrate, and a non-alkali glass substrate (for example, #1737 manufactured by Corning Incorporated), for example, may be used as the glass substrate 408. As shown in FIG. 4, the gate electrode 411 and the source electrode 410 are electrode wirings disposed in a grid-shape, and the switch device 407b composed of the thin film transistor (TFT) is formed to each of the intersecting points thereof.

The source and the drain of the switch device 407b are connected to the source electrode 410 and the drain electrode 412, respectively. The source electrode 410 has a linear wire portion as a signal line and an extended portion constituting the switch device 407b, and the drain electrode 412 is disposed so as to connect the switch device 407b to the charge accumulation capacitance 407c.

The gate insulation film 413 is composed of SiNx, SiOx. The gate insulation film 413 is formed to cover the gate electrode 411 and the Cs electrode 418, and the portion of the gate insulation film 413 located on the gate electrode 411 acts as a gate insulation film in the switch device 407b, and the portion thereof located on the Cs electrode 418 acts as a dielectric layer in the charge accumulation capacitance 407c. That is, the charge accumulation capacitance 407c is formed in the superimposed region of the Cs electrode 418 and the drain electrode 412 while the Cs electrode 418 is formed in the same layer as the gate electrode 411. Note that an anode oxide film formed by subjecting the gate electrode 411 and the Cs electrode 418 to anode oxidation may be also used as the gate insulation film 413 in addition to the SiNx and the SiOx.

Further, the channel layer (i layer) 415 is a channel portion of the switch device 407b and a current path for connecting the source electrode 410 to the drain electrode 412. The contact electrode (n+ layer) 416 causes the source electrode 410 to come into contact with the drain electrode 412.

The insulation protection film 417 is formed on approximately the overall surface (approximately the overall region) of the source electrode 410 and the drain electrode 412, that is, the glass substrate 408. With this arrangement, the insulation protection film 417 protects the drain electrode 412 and the source electrode 410 as well as electrically insulates them. Further, the insulation protection film 417 has a contact hole 421 at a predetermined position, that is, in a portion in which the drain electrode 412 faces the Cs electrode 418.

The charge collection electrode 407a is formed of an amorphous transparent conductive oxide film. The charge collection electrode 407a is formed to fill the contact hole 421 and layered above the source electrode 410 and the drain electrode 412. The charge collection electrode 407a electrically conducts to the photoconductive layer 404 so that it may collect the charges generated in the photoconductive layer 404.

Subsequently, the charge collection electrode 407a will be explained in detail. The charge collection electrode 407a used in the exemplary embodiment is composed of the amorphous transparent conductive oxide film. A material having a basic composition of an oxide of indium and tin (ITO: Indium-Tin-Oxide), an oxide of indium and zinc (IZO: Indium-Zinc-Oxide), an oxide of indium and germanium (IGO: Indium-Germanium-Oxide) may be used as the material of the amorphous transparent conductive oxide film.

Although various types of metal films and conductive oxide films are used as the charge collection electrode 407a, a transparent conductive oxide film such as ITO (Indium-Tin-Oxide) or the like is often used because of the following reason. When X-rays are incident on the radiation detector in a large amount, unnecessary charges may be captured in a semiconductor film (or in the vicinity of the interface between the semiconductor film and an adjacent layer).

These remaining charges are stored for a long time or migrate in a long time, thereby affection arises so that X-ray detection characteristics are deteriorated when an image is detected thereafter or a remaining image (virtual image) appears. To cope with the above affect, a method of erasing the remaining charges, when they are generated in the photoconductive layer, by exciting them by radiating light thereto from the outside of the photoconductive layer 404 is disclosed in JP-A Publication No. 9-9153 (which corresponds to U.S. Pat. No. 5,563,421). In this case, it is necessary that the charge collection electrode 407a be transparent to effectively radiate light from the lower side of the photoconductive layer 404 (from the charge collection electrode 407a side).

Further, it is desired to form the charge collection electrode 407a so as to cover the switch device in order to increase the area filling factor (filling factor) of the charge collection electrode 407a or in order to shield the switch device. However, when the charge collection electrode 407a is opaque, the switch device may not be observed after the charge collection electrode 407a is formed.

When, for example, the characteristics of the switch device are examined after the charge collection electrode 407a is formed, if the switch device is covered with the opaque charge collection electrode 407a, even if defective characteristics of the switch device are found, the switch device may not be observed with an optical microscope to solve the cause of the defective characteristics. Accordingly, it is preferable that the charge collection electrode 407a be transparent so that the switch device may be easily observed even after the charge collection electrode 407a is formed.

The interlayer insulation film 420 is composed of acrylic resin having photosensitivity to electrically insulate the switch device 407b. The contact hole 421 passes through the interlayer insulation film 420, and the charge collection electrode 407a is connected to the drain electrode 412. As shown in FIG. 3, the contact hole 421 is formed in an inverse taper shape.

A high-voltage power supply (not shown) is connected between the bias electrode 401 and the Cs electrode 418. Note that the arrangement for electrically connecting the high-voltage wire 432 connected to the high-voltage power supply to the bias electrode 401 will be described later.

(Arrangement for Covering Photoconductive Layer)

Next, an arrangement for covering the photoconductive layer 404 will be explained. As shown in FIG. 1, a cover glass 440 is disposed above the bias electrode 401 as an example of a cover member for covering the bias electrode 401.

A protection member 442, to which the cover glass 440 is joined, is disposed on the glass substrate 408. The protection member 442 stands on the outer periphery of the glass substrate 408 and surrounds a predetermined region including the photoconductive layer 404 from four sides. That is, the predetermined region is partitioned by the protection member 442 for surrounding the periphery of the region.

The protection member 442 is formed in a box shape with the upper and lower portions thereof opened, and the lower open portion of the protection member 442 is closed by the glass substrate 408 and the upper open portion thereof is closed by the cover glass 440, thereby a closed space having a predetermined size is formed. The photoconductive layer 404 is accommodated in the closed space and covered with the cover glass 440, the glass substrate 408, and the protection member 442.

A step is formed which is lowered on the inner wall side of the protection member 442 (on the photoconductive layer 404 side, which is the same in the following description), the lower surface of the cover glass 440 is joined to the upper surface 442b of the step, and the cover glass 440 is supported by the protection member 442.

The joint portion of the protection member 442 with the cover glass 440 is disposed outside of the photoconductive layer 404. That is, the protection member 442 is joined to the cover glass 440 in the region where the photoconductive layer 404 does not exist above the glass substrate 408. In other words, the protection member 442 is not joined to the cover glass 440 in a region above the photoconductive layer 404.

Note that an insulating member having an insulation property is used as the protection member 442, and, for example, resin and glass having an insulation breakdown voltage of 10 kV/mm or more is used as the insulating member. With this arrangement, the insulation property of the joint portion of the high-voltage wire 432 with the extended electrode 431 is secured.

Polycarbonate, polyethylene terephthalate (PET), polymethyl methacrylate (acryl), and polyvinyl chloride are used as the resin having the insulation breakdown voltage of 10 kV/mm or more as shown in a table of FIG. 6.

Note that, in the exemplary embodiment, the thickness of a side wall 442a of the protection member 442 is set to 1 mm, and a voltage applied from the high-voltage wire 432 to the extended electrode 431 is set to 10 kV. Accordingly, the insulation property of the protection member 442 to the outside is secured by using the resin having the insulation breakdown voltage of 10 kV/mm or more.

Further, the space (predetermined region partitioned by the protection member 442) surrounded by the cover glass 440, the protection member 442, and the glass substrate 408, is filled with a thermosetting resin 444 as a filling member. Room-temperature thermosetting resin, for example, epoxy resin, silicon resin is used as the thermosetting resin 444.

Further, a space 445 having an open upper portion is formed at a portion which constitutes one side of the protection member 442 for surrounding the predetermined region including the photoconductive layer 404 from four sides.

(Arrangement for Electrically Connecting Bias Electrode to High-Voltage Wire)

Figure 5:
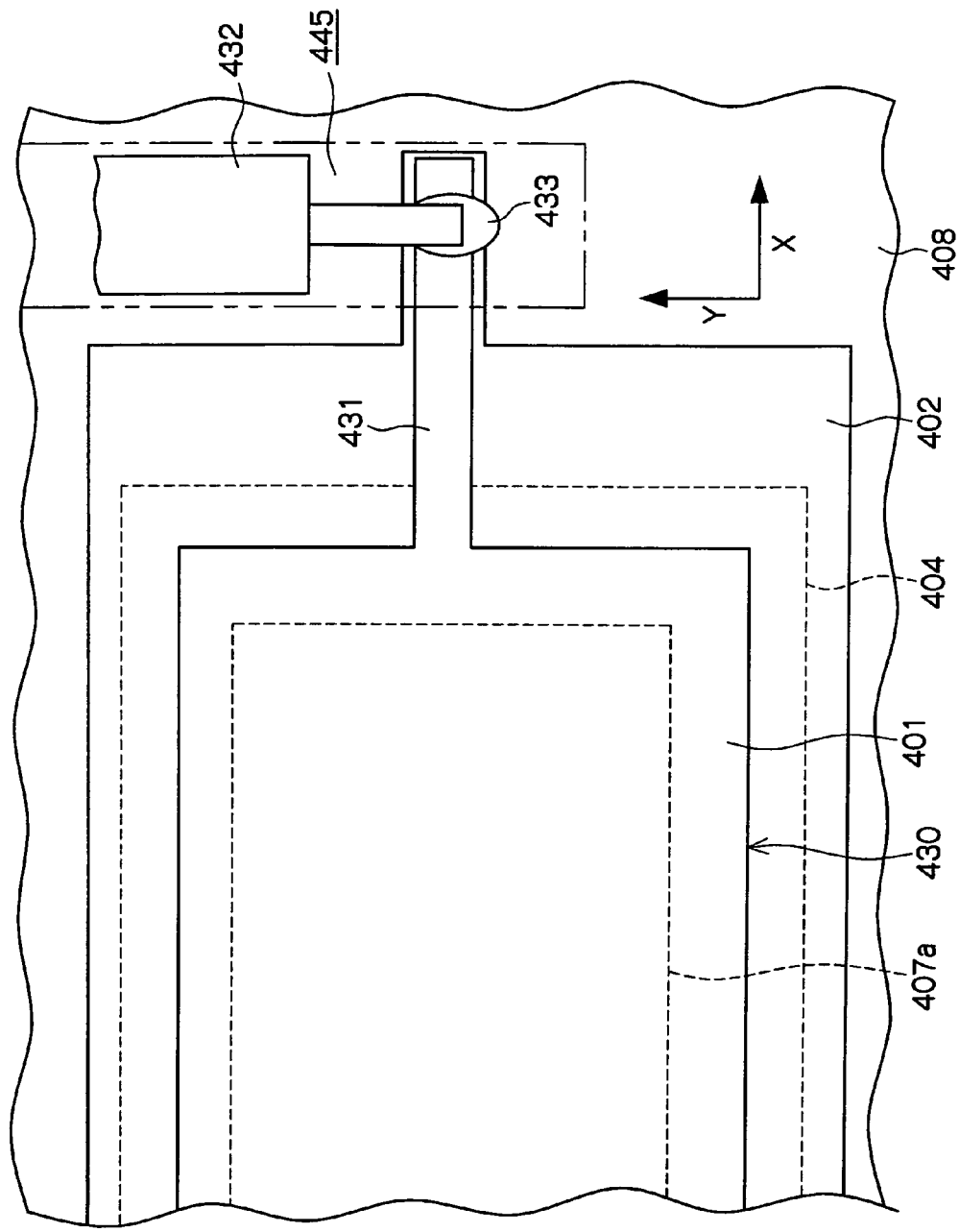
FIG. 5 is a schematic plan view showing a joint portion in which an extended electrode is connected to a high-voltage wire in the radiation detector using the electric reading system.

An arrangement for electrically connecting the bias electrode 401 to the high-voltage wire 432 in the radiation detector 400 using the electric reading system will be explained. FIG. 5 is a schematic plan view showing the joint portion in which the extended electrode 431 is connected to the high-voltage wire 432.

As shown in FIG. 1, the extended electrode 431 is formed from the bias electrode 401 and extend outside of the inner wall of the protection member 442, that is, the extended electrode 431 is provided at a portion outside of the boundary B between the predetermined region partitioned by the protection member 442 and the protection member 442. The extended electrode 431 and the bias electrode 401 constitute the electrode layer 430 and are formed integrally with each other in the same process.

As shown in FIG. 5, the extended electrode 431 projects from a side of the bias electrode 401 and is pulled down up to the glass substrate 408, which is the lowest portion of the radiation detector 400, along the downward side surface of the photoconductive layer 404 as shown in FIG. 1.

Further, the extended electrode 431 extends to the region in which the photoconductive layer 404 does not exist on the glass substrate 408 and further extends up to the space 445 formed in the protection member 442.

The width of the extended electrode 431 in the direction (Y-direction of FIG. 5) orthogonal to the extending direction thereof (X-direction of FIG. 5) is formed narrower than the bias electrode 401. With this arrangement, a material for forming the electrode layer 430 may be reduced. Note that the extended electrode 431 may be formed as wide as or wider than the bias electrode 401.

The hole injection blocking layer 402 is formed from between the photoconductive layer 404 and the bias electrode 401 to between the extended electrode 431 and the glass substrate 408 and further extend outside of the inner wall of the protection member 442, that is, outside of the predetermined region partitioned by the protection member 442 likewise the extended electrode 431.

Further, the hole injection blocking layer 402 is directly formed on the glass substrate 408 and used also as a base member for joining the extended electrode 431 with the glass substrate 408. A material, by which the close contact properties between the hole injection blocking layer 402 and the glass substrate 408 and between the hole injection blocking layer 402 and the extended electrode 431 are made higher than the close contact property between the extended electrode 431 and the glass substrate 408, is used as the material of the hole injection blocking layer 402.

The joint force between the extended electrode 431 and glass substrate 408 may be increased by using the hole injection blocking layer 402 having the close contact property to the glass substrate 408 and to the extended electrode 431 higher than the close contact property of the extended electrode 431 to the glass substrate 408 as the base member.

The extended electrode 431 is electrically connected to the high-voltage wire 432 in the space 445 in the protection member 442 which is the region on the glass substrate 408 in which the photoconductive layer 404 does not exist. The high-voltage wire 432 is a conductor for applying a bias voltage from the extended electrode 431 to the photoconductive layer 404 through the bias electrode 401.

The high-voltage wire 432 is pulled in from the outside and electrically connected to the extreme end of the extended electrode 431 by a conductive paste 433.

(Manufacturing Process of Radiation Detector 400 Using Electric Reading System)

An example of a manufacturing process for the radiation detector 400 using the will be schematically explained.

First, the electron injection blocking layer 406 composed of antimony sulfide ($Sb_2S_3$) having a film thickness of 2 μm is formed on the active matrix substrate 450. The photoconductive layer 404 having a film thickness of 1000 μm and composed of amorphous Se is formed by forming a Se material to a film by vapor deposition.

The hole injection blocking layer 402 having a film thickness of 0.3 μm and composed of antimony sulfide ($Sb_2S_3$) is formed on the photoconductive layer 404. The electrode layer 430 having a film thickness of 0.1 μm and composed of the bias electrode 401 and the extended electrode 431 is formed by forming Au to a film by vapor deposition.

The protection member 442 having the space 445 formed thereto is attached on the outer periphery of the glass substrate 408, and further the cover glass 440 is attached to the protection member 442.

Next, the space, which is surrounded by the cover glass 440, the protection member 442, and the glass substrate 408, is filled with the thermosetting resin 444 through a hole (not shown).

Next, the extended electrode 431 is electrically connected to the high-voltage wire 432 in the space 445 of the protection member 442.

(Operation Principle of Radiation Detector using Electric Reading System)

Next, the operation principle of the radiation detector 400 using the electric reading system will be explained. When X-rays are radiated onto the photoconductive layer 404, charges (electrons-hole pairs) are generated in the photoconductive layer 404. In the state that a voltage is applied between the bias electrode 401 and the Cs electrode 418, that is, in the state that the voltage is applied to the photoconductive layer 404 through the bias electrode 401 and the Cs electrode 418, since the photoconductive layer 404 is electrically connected in series to the charge accumulation capacitance 407c, the electrons generated in the photoconductive layer 404 migrate to a positive electrode side, and the holes generated therein migrate to a negative electrode side with a result that the charges are accumulated to the charge accumulation capacitance 407c.

The charges accumulated to the charge accumulation capacitance 407c is output to the outside through the source electrode 410 by turning on the switch device 407b in response to a signal input to the gate electrode 411. Since electrode wiring of the gate electrode 411 and the source electrode 410, the switch devices 407b and the charge accumulation capacitances 407c are disposed in a matrix state, the image information of X-rays may be two-dimensionally obtained by sequentially scanning the signals input to the gate electrode 411 and detecting the signal from each of the source electrodes 410.

(Operation/Working Effect of Radiation Detector Using Electric Reading System)

Next, the operation/working effect of the radiation detector 400 using the electric reading system will be explained.

In the arrangement of the exemplary embodiment, the extended electrode 431 is electrically connected to a conductor outside of the inner wall of the protection member 442, and the bias voltage is applied to the photoconductive layer 404 from the bias electrode 401 through the extended electrode 431.

Incidentally, in an arrangement, in which the high-voltage wire 432 is connected to the bias electrode 401 above the photoconductive layer 404, the photoconductive layer 404 composed of the amorphous material is pressed and deteriorated by being crystallized depending on the situation in which it is manufactured and on the situation in which it is used thereafter.

Figure 7:
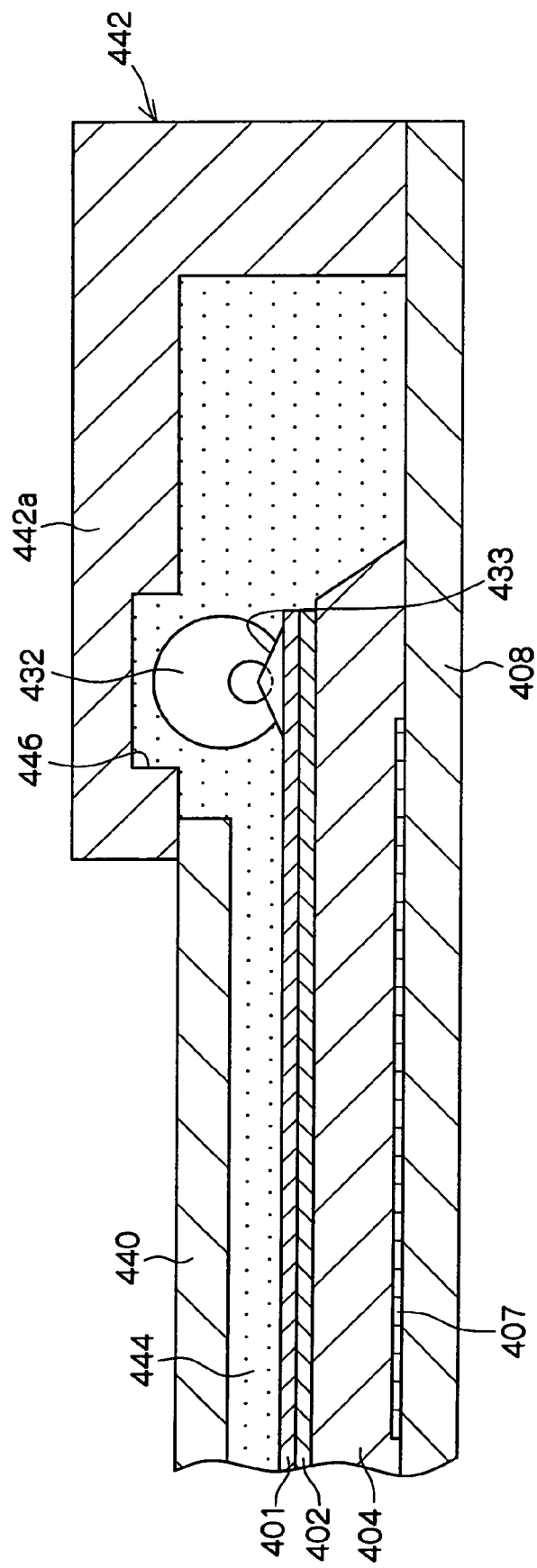
FIG. 7 is a schematic view showing an arrangement of a radiation detector using an electric reading system according to a comparative example.

Further, in the arrangement, in which the high-voltage wire 432 is connected to the bias electrode 401 above the photoconductive layer 404, a space larger than the outside diameter of the high-voltage wire 432 must be formed between the photoconductive layer 404 and the cover glass 440. When the space is filled with the thermosetting resin 444, the thickness of the thermosetting resin 444 is made larger than the outside diameter of the high-voltage wire 432, thereby the charge conversion efficiency of the photoconductive layer 404 is deteriorated. Further, when it is intended to make the space between the photoconductive layer 404 and the cover glass 440 smaller than the outside diameter of the high-voltage wire 432 to suppress the deterioration of the charge conversion efficiency of the photoconductive layer 404, it is necessary to form a recessed portion 446 on the inner surface of the protection member 442 to which the cover glass 440 is joined to accommodate the high-voltage wire 432 therein as shown in FIG. 7. When the recessed portion 446 is formed as described above, the stress-strain distribution, which is caused by the change of peripheral environment (mainly, temperature) and the difference of the thermal expansion coefficients among the respective members is maximized depending on a location. In particular, the photoconductive layer 404 is damaged by the stress generated on the photoconductive layer 404, from which a problem such as crystallization of the photoconductive layer 404 composed of the amorphous material, exfoliation between the respective layers arises.

In contrast, in the exemplary embodiment, since the extended electrode 431 is electrically connected to the conductor outside of the inner wall of the protection member 442, the pressure applied to the photoconductive layer 404 is reduced, thereby the deterioration of the photoconductive layer 404 is suppressed.

Further, since the extended electrode 431 is electrically connected to the high-voltage wire 432 outside of the inner wall of the protection member 442, a work for connecting the extended electrode 431 to the high-voltage wire 432 may be performed even in the state in which the photoconductive layer 404 is surrounded by the protection member 442, thereby the deterioration of the photoconductive layer 404 is suppressed even while the connection work is performed.

Since the extended electrode 431 may be connected to the high-voltage wire 432 in a process after the protection member 442 is attached to the glass substrate 408, the connection work is not performed in the state that the photoconductive layer 404 and the bias electrode 401 are exposed, and further the connection work (wiring work) is easily performed.

Further, since the interval between the photoconductive layer 404 and the cover glass 440 may be reduced without forming the recessed portion 446 on the inner surface of the protection member 442, the charge conversion efficiency of the photoconductive layer 404 is not deteriorated, and further the stress to the photoconductive layer 404, which is caused by the difference of the thermal expansion coefficients of the respective member, may be reduced even if the peripheral environment (mainly, temperature) is changed. With this arrangement, the crystallization of the photoconductive layer 404 composed of the amorphous material and the exfoliation between the respective layers is suppressed.

Further, in the arrangement of the exemplary embodiment, the hole injection blocking layer 402 is formed from between the photoconductive layer 404 and the bias electrode 401 to between the extended electrode 431 and the glass substrate 408, thereby the close contact property between the extended electrode 431 and the glass substrate 408 may be enhanced.

Further, when Au is used in the electrode layer 430, the electrode layer 430 has a poor close contact property with the glass substrate 408. However, since the hole injection blocking layer 402 enhances the joint force between the extended electrode 431 and the glass substrate 408, the exfoliation between the extended electrode 431 and the glass substrate 408 is suppressed. Further, when the hole injection blocking layer 402 is used, since the exfoliation is suppressed only by the existing layer arrangement without newly forming a member for enhancing the joint force between the extended electrode 431 and the glass substrate 408, the number of parts and the number of manufacturing processes are not increased.

Further, in the exemplary embodiment, since the joint portion for joining the cover glass 440 to the protection member 442 is disposed outside of the photoconductive layer 404, the stress generated at the joint portion of the cover glass 440 with the protection member 442 is suppressed from being transmitted to the photoconductive layer 404 through the thermosetting resin 444. With this arrangement, the pressure received by the photoconductive layer 404 is reduced as well as the deterioration of the photoconductive layer 404 is suppressed.

Further, when the high-voltage wire 432 is connected to the extended electrode 431 outside of the protection member 442, a different member is necessary to cover the connecting portion between the high-voltage wire 432 and the extended electrode 431 in order to secure insulation therebetween. In the exemplary embodiment, however, since they are connected to each other in the protection member 442, the connecting portion in which the high-voltage wire 432 is connected to the extended electrode 431 is covered with the protection member 442, thereby an increase of the number of parts may be suppressed.

(Modification of Arrangement for Electrically Connected Bias Electrode to High-Voltage Wire)

Figure 8:
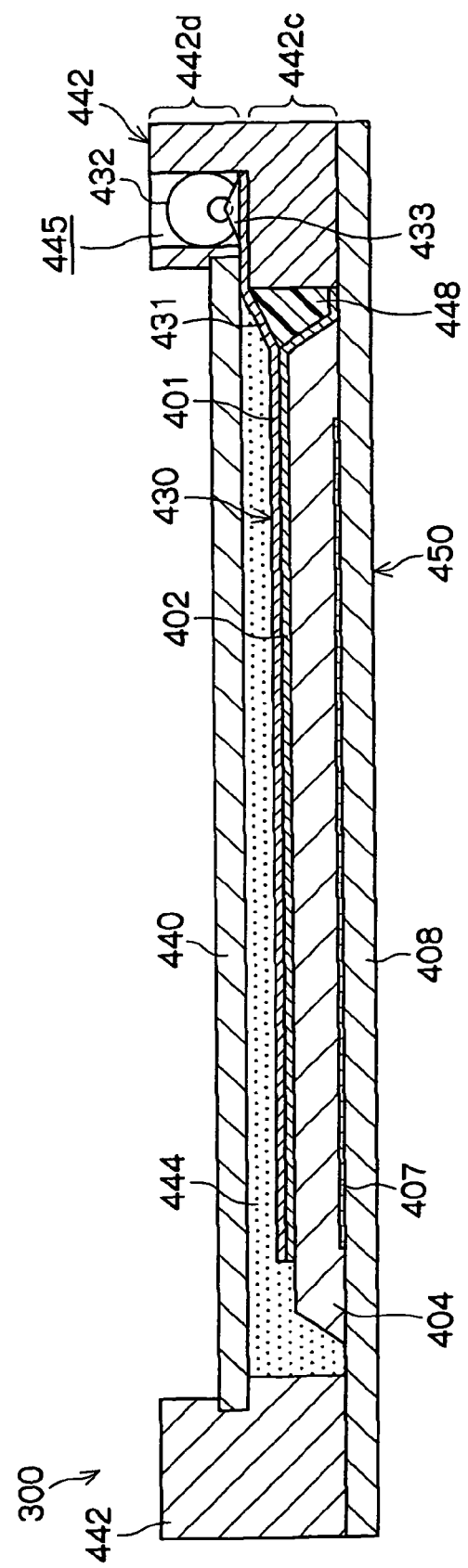
FIG. 8 is a schematic view showing an overall arrangement of a radiation detector using an electric reading system according to a modification.
Figure 9:
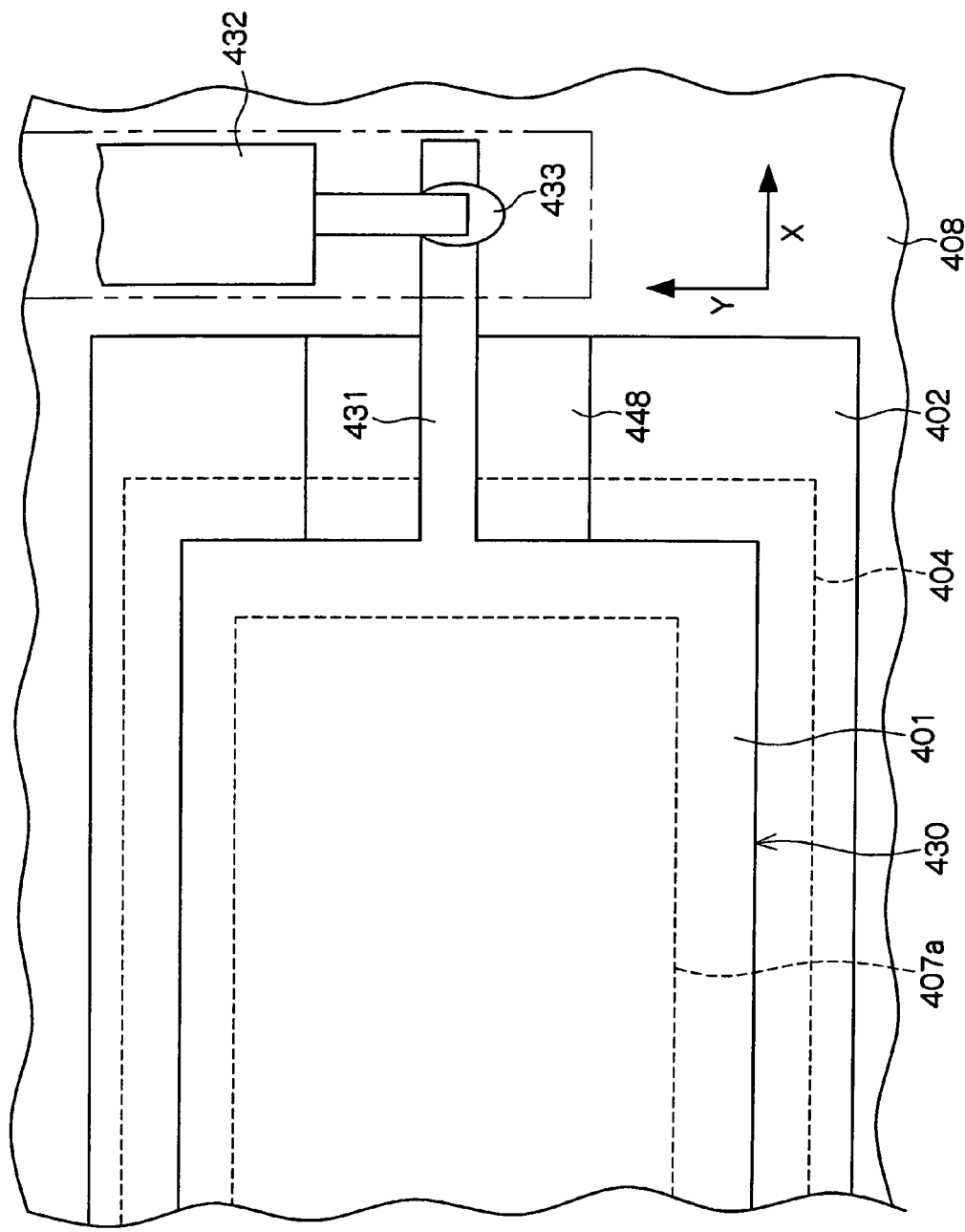
FIG. 9 is a schematic plan view showing a connecting portion in which an extended electrode is connected to a high-voltage wire in the radiation detector using an electric reading system according to the modification.

A modification of an arrangement for electrically connecting the bias electrode 401 to the high-voltage wire 432 will be explained. FIG. 8 is a schematic view showing an overall arrangement of a radiation detector using an electric reading system according to the modification. FIG. 9 is a schematic plan view showing a connecting portion in which the extended electrode 431 is connected to the high-voltage wire 432 in the modification.

In the radiation detector 300 using the electric reading system according to the modification, a bridge 448 is formed between the glass substrate 408 and the extended electrode 431 as an example of an intermediate member for keeping a predetermined interval between the glass substrate 408 and the extended electrode 431. The bridge 448 is formed between the protection member 442 and the photoconductive layer 404 on the glass substrate 408.

Further, the upper surface of the bridge 448 is formed from the upper surface of the photoconductive layer 404 (in more detail, the hole injection blocking layer 402) to the upper surface of a step formed at the inner wall side of the protection member 442.

The extended electrode 431 constitutes the electrode layer 430 together with the bias electrode 401 and is formed integrally with each other in the same process. Further, as shown in FIG. 8, the extended electrode 431 projects from a side of the bias electrode 401, is layered on the bridge 448, and reaches the space 445 in the protection member 442. That is, the bridge 448 has a function for bridging the extended electrode 431 from the upper surface of the photoconductive layer 404 (in more detail, the hole injection blocking layer 402) to the upper surface of the step formed to the inner wall side of the protection member 442.

The bridge 448 is formed of thermosetting resin, and room temperature thermosetting resin, for example as epoxy resin or silicon resin is used.

The width of the extended electrode 431 in the direction (Y-direction of FIG. 9) orthogonal to the extending direction thereof (X-direction of FIG. 9) is formed narrower than the bias electrode 401. With this arrangement, a material for forming the electrode layer 430 may be reduced. Note that the width of the extended electrode 431 may be formed as wide as or wider than that of the bias electrode 401.

The upper surface of the bridge 448 is preferably formed in a plane shape continuous from the upper surface of the photoconductive layer 404 (in more detail, the hole injection blocking layer 402) to the upper surface of the step formed to the inner wall side of the protection member 442. With this arrangement, no step is formed on the surface on which the extended electrode 431 is formed so that disconnection is prevented.

According the radiation detector 300 using the electric reading system of the modification, since the bridge 448 formed between the glass substrate 408 and the extended electrode 431 keeps the predetermined interval between the glass substrate 408 and the extended electrode 431, the extended electrode 431 is insulated from the charge collection electrodes 407a of the glass substrate 408.

(Manufacturing Process of Radiation Detector 400 Using Electric Reading System according to Modification)

An example of the manufacturing process of the radiation detector 400 using the electric reading system according to the modification will be schematically explained.

First, the electron injection blocking layer 406 having a thickness of 2 μm and composed of the antimony sulfide ($Sb_2S_3$) is formed on the active matrix substrate 450. The photoconductive layer 404 having the thickness of 1000 μm and composed of amorphous Se is formed by forming a film of the Se material by vapor deposition.

The hole injection blocking layer 402 having a film thickness of 0.3 μm and composed of the antimony sulfide ($Sb_2S_3$) is formed on the photoconductive layer 404. The lower portion 442c of the protection member 442 (portion below the extended electrode 431 and formed in the protection member 442) is attached on the outer periphery of the glass substrate 408.

The bridge 448 is then formed between the lower portion 442c of the protection member 442 and the photoconductive layer 404 on the glass substrate 408.

The electrode layer 430 having a film thickness of 0.1 μm and composed of the bias electrode 401 and the extended electrode 431 is formed by forming a film of AU by vapor deposition.

The cover glass 440 is then attached on the upper surface of the lower portion 442c of the protection member 442. Then, the upper portion 442d of the protection member 442 is attached on the lower portion 442c of the protection member 442.

The space, which is surrounded by the cover glass 440, the protection member 442, and the glass substrate 408, is filled with the thermosetting resin 444 through a hole (not shown).

Next, the extended electrode 431 is electrically connected to the high-voltage wire 432 in the space 445 of the protection member 442.

(Arrangement of Radiation Detector Using Optical Reading System)

The invention may be also applied to a radiation detector using an optical reading system according to the above arrangement for electrically connecting the bias electrode to the high-voltage wire and covering the photoconductive layer. A radiation detecting substrate 500 will be explained here as the radiation detector using the optical reading system.

FIGS. 10A and 10B show a schematic view of the radiation detecting substrate 500. As shown in FIGS. 10A and 10B, TCPs (Tape Carrier Packages) 510, a read-out device 512 connected through the TCPs 510, and a high voltage wire 514 for applying a high voltage are connected to the radiation detecting substrate 500.

Each of the TCPs 510 is a flexible wiring substrate on which a signal detection IC (charge amplifier IC) 511 is mounted. The TCP 510 is thermally connected under pressure using ACF (Anisotropic Conductive Film).

An extended electrode 519 is formed so as to extend from an upper electrode 518 on a detection area 516, and the high voltage wire 514 is fixed to the extended electrode 519 by a conductive bonding agent. The detection area 516 for detecting radiation is composed of lower electrodes 520 for reading out signals and applying a high voltage, a radiation detecting layer 522 for converting the radiation into charges, and an upper electrode 518 for applying the high voltage.

The radiation detecting substrate 500 is manufactured roughly by a process for forming a lower radiation detecting substrate 524 including the lower electrodes 520, a process for forming the radiation detecting layer 522 and the upper electrode 518, and a process for connecting the high voltage wire 514.

The structure of the lower radiation detecting substrate 524 will be explained below. FIG. 11 shows a schematic structure of the lower radiation detecting substrate 524. In FIG. 11, each one sets of the TCPs 510 are formed on the right and left sides and each TCP 510 has three channels, that is, the TCPs 510 have six channels in total for explanation simplification. As shown in FIG. 11, the lower radiation detecting substrate 524 is composed of a radiation detecting unit 526, a pitch conversion unit 528, and TCP connecting portions 530.

The lower electrodes 520 are disposed to the radiation detecting unit 526 in a stripe shape (line shape) to output signals. Further, color filter layers 534 are formed below the lower electrodes 520 so that light having an optional wavelength may be transmitted through organic transparent insulation layers 532.

The layers located above the color filter layers 534 are called common B lines 520B, and the layers located above the portions where the color filter layers 534 are not formed are called signal S lines 520S. The B lines 520B are made to a common line outside of the radiation detecting unit and have a comb-shaped electrode structure. The S lines 520S are used as signal lines. The B lines 520B have a width of, for example, 20 μm, the S lines 520S have a width of, for example, 10 μm, and the interval between the B line 520B and the S line 520S, is, for example, 10 μm.

The color filter layer 534 has a width of, for example, 30 μm. The lower electrode 520 must be transparent to radiate light from the back surface thereof and must be flat to prevent it from being broken by the concentration of an electric field when the high voltage is applied thereto, and, for example, IZO, ITO are used for the lower electrode 520. When IZO is used, the lower electrode 520 has a thickness of about 0.2 μm and a flatness Ra of about 1 nm.

The color filter layers 534 are composed of a photosensitive resist in which pigment is dispersed, for example, a red resist used for, for example, a LCD color filter. To eliminate the uneven portion of the color filter layers 534, the organic photosensitive transparent insulation layers 532, for example, PMMAs are used.

Further, a substrate 536 acting as a support member is preferably rigid transparent glass and more preferably soda lime glass. As an example of the thickness of the respective layers, the thickness of the lower electrode 520 is 0.2 μm, the thickness of the color filter layer 534 is 1.2 μm, the thickness of the transparent organic insulation layer 532 is 1.8 μm, and the thickness of the glass substrate 536 is 1.8 mm. The color filter layers 534 and the organic insulation layers 532 are located only to the radiation detecting unit 526, and the boundaries thereof are located in the radiation detecting unit 526 and the pitch conversion unit 528. Accordingly, IZO wirings are formed on the glass substrate 536 in the TCP connecting portions 530 through the boundary step portions of the organic insulation layers 532.

In the radiation detecting unit 526, wirings may be taken out to the right and left TCPs 510 in the unit of a certain number. In FIG. 11, the wirings are taken out in the unit of three lines. An example of the number of the lines is 256. The width of the lines in the radiation detecting unit 526 is different from that in the TCP connecting portions 530. To adjust the difference of the widths and to wire the wirings up to predetermined TCP connecting positions, the width of the lines is adjusted at the pitch conversion unit 528. The B lines 520B are made to a common line and wired up to the TCP connecting portions 530 likewise.

The common B line 520B which are made common outside of the radiation detecting unit and the signal S lines 520S are disposed to the TCP connecting portions 530. The common B lines 520B are disposed outside of the signal S lines 520S. As an example of the number of the lines, the signal lines are 256 lines and each of the upper and lower common lines is 5 wirings, and they are connected to the TCPs. The electrode line/space is 40/40 μm.

Further, a TCP alignment mark is necessary to connect the TCPs in the TCP connecting portions 530. Although it is preferable to form the TCP alignment mark of a transparent electrode, it is difficult to recognize it because it is transparent. Thus, the alignment mark is formed using, for example, the color filter layers 534, which is the member for constituting the substrate and an opaque material.

Next, the radiation detecting layer 522 will be explained. FIG. 12 is a schematic view showing an arrangement of the radiation detecting substrate 500. As shown in FIG. 12, the radiation detecting layer is composed of a recording photoconductive layer 542, a charge accumulation layer 544, a reading photoconductive layer 546, an electrode interface layer 548, an under coating layer 550, and an upper coating layer 552.

<Recording Photoconductive Layer>

The recording photoconductive layer 542 is a photoconductive substance for generating charges by absorbing a wave and composed of a compound mainly composed of at least one of an amorphous selenium compound, $Bi_{12}MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K); PbO, $HgI_2$, $PbI_2$, CdS, CdSe, CdTe, $BiI_3$, GaAs. In particular, it is more preferable that the recording photoconductive layer 542 be composed of the amorphous selenium compound.

When the amorphous selenium compound is used as the recording photoconductive layer 542, the layer 542 may be doped with alkali metal such as Li, Na, K, Cs, Rb in the slight amount from 0.001 ppm to 1 ppm, doped with fluoride such as LiF, NaF, KF, CsF, RbF in the slight amount from 10 ppm to 10000 ppm, added with P, As, Sb, Ge from 50 ppm to 0.5%, doped with As from 10 ppm to 0.5%, and doped with Cl, Br, I in the slight amount from 1 ppm to 100 ppm.

In particular, amorphous selenium containing As from about 10 ppm to 200 ppm, amorphous selenium containing As from about 0.2% to 1% and further containing Cl from 5 ppm to 100 ppm, and amorphous selenium containing alkali metal from about 0.001 ppm to about 1 ppm are preferably used.

Further, amorphous selenium, which contains the fine particles of a photoconductive substance such as $Bi_{12}MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$, GaAs each having a particle size of several nanometers to several micron meters may be used.

When the amorphous selenium is used, it is preferable that the recording photoconductive layer 542 have a thickness from 100 μm or more to 2000 μm or less. Further, it is particularly preferable that when the recording photoconductive layer 542 is used for mammography, the thickness of the layer 542 be 150 μm or more to 250 μm or less and that when the recording photoconductive layer 542 is used for taking a general purpose image, the thickness thereof be 500 μm or more to 1200 μm or less.

<Charge Accumulation Layer>

The charge accumulation layer 544 may be any film as long as it has an insulation property to the charges having a polarity desired to be accumulated and are composed of acrylic organic resin, polymer such as polyimide, BCB, PVA, acryl, polyethylene, polycarbonate, or polyetherimide, sulphide such as $As_2S_3$, $Sb_2S_3$, or ZnS, oxide, and fluoride. Further, a substance, which has the insulation property to the charges having the polarity desired to be accumulated and has conductivity to the charges having the a polarity opposite to the above polarity, is more preferable, and a substance, in which the product of the degree of mobility and the life is larger than the polarity of the charges by three digits or more, is more preferable.

Exemplified as preferable compounds are $As_2Se_3$ and $As_2Se_3$ doped with Cl, Br, I from 500 ppm to 20000 ppm, $As_2(Se_xTe_{1-x})3(0.5<x<1)$ in which about 50% of Se in $As_2Se_3$ is replaced with Te, a compound in which about 50% of Se in $As_2Se_3$ is replaced with S, a compound in which the concentration of As in $As_2Se_3$ is changed about ±15%, and amorphous Se—Te in which Te is contained in the amount of 5 to 30 wt %.

When a substance containing these chalcogenide elements is used, the charge accumulation layer 544 preferably has a thickness from 0.4 μm or more to 3.0 μm or less and more preferably has a thickness from 0.5 μm or more to 2.0 μm or less. The charge accumulation layer 544 may be formed at a time or may be formed by the lamination performed at a plurality of times.

A compound in which polymer such as organic acrylic resin, polyimide, BCB, PVA, Acryl, polyethylene, polycarbonate, or polyetherimide each doped with a charge transport agent is preferably used as a preferable charge accumulation layer 544 using an organic film. Exemplified as a preferable charge transport agent are tris(8-quinolinolate)aluminum (Alq3), N,N-diphenyl-N,N-di(m-tolyl)benzidine (TPD), polyparaphenylene vinylene (PPV), polyalkylthiophene, polyvinylcarbazole (PVK), triphenylene (TNF), metal phthalocyanine, 4-(dicyanomethylene)-2-methyl-6(p-dimethylaminostyryl)-4H-pyrane (DCM), liquid crystal molecule, hexapentyloxy-triphenylene, discotic liquid crystal molecule whose center core contains a π conjugate condensed ring or transition metal, and molecule selected from a group composed of carbon nanotube and fullerene. A doping amount is set from 0.1 to 50 wt %.

<Reading Photoconductive Layer>

The reading photoconductive layer 546 is composed of a photoconductive substance for absorbing an electromagnetic wave, in particular, visible light and generates charges, and a semiconductor substance such as an amorphous selenium compound, amorphous Si:H, crystal Si, GaAs in which an energy gap is within the range from 0.7 to 2.5 eV may be used. In particular, the amorphous selenium compound is preferably used.

When the amorphous selenium compound is used as the reading photoconductive layer 546, the layer may be doped with alkali metal such as Li, Na, K, Cs, Rb in the slight amount from 0.001 ppm to 1 ppm, doped with fluoride such as LiF, NaF, KF, CsF, RbF in the slight amount from 10 ppm to 10000 ppm, added with P, As, Sb, Ge from 50 ppm to 0.5%, doped with As from 10 ppm to 0.5%, and doped with Cl, Br, I in the slight amount from 1 ppm to 100 ppm.

In particular, an amorphous selenium compound containing As from about 10 ppm to 200 ppm, an amorphous selenium compound containing As from about 0.2% to 1% and further containing Cl of from 5 ppm to 100 ppm, and an amorphous selenium compound containing alkali metal from about 0.001 ppm to 1 ppm are preferably used.

The reading photoconductive layer 546 may have any thickness as long as it may sufficient absorb reading light as well as may drift the charges, which are accumulated in the charge accumulation layer 544 and by which an electric field is optically excited, and the thickness is preferably from about 1 μm to 30 μm.

<Electrode Interface Layer>

The electrode interface layer 548 is disposed between the recording photoconductive layer 542 and the upper electrode 518 or between the reading photoconductive layer 546 and the lower electrodes 520. To prevent crystallization, an amorphous selenium compound added with As in the range from 1% to 20%, an amorphous selenium compound added with S, Te, P, Sb, Ge in the range from 1% to 10%, and an amorphous selenium compound added with the above elements and other elements in combination are preferably used.

Otherwise, $As_2S_3$ and $As_2Se_3$ having a higher crystallization temperature may be preferably used. Further, to prevent injection of charges from the electrode layer and in particular to prevent the injection thereof from the holes, alkali metal such as Li, Na, K, Rb, Cs and the molecules of LiF, NaF, KF, RbF, CsF, LiCl, NaCl, KCl, RbF, CsF, CsCl, CsBr may be preferably doped in the range from 10 ppm to 5000 ppm in addition to the additive elements. On the contrary, to prevent injection of electrons, a halogen element such as Cl, I, Br and the molecules of $In_2O_3$ may be also preferably doped in the range from 10 ppm to 5000 ppm. The thickness of the interface layer is preferably set from 0.05 μm to 1 μm to sufficiently achieve the above objects.

The electrode interface layer 548, the reading photoconductive layer 546, the charge accumulation layer 544, and the recording photoconductive layer 542 are layered on the substrate in such a manner that the substrate is held in a vacuum vessel set from $10^{-3}$ to $10^{-7}$ Torr at 25° C. or more to 70° C. or less, boats or crucibles in which the above alloys are contained are heated by resistance heating or electron beam heating, and the alloys or the compounds are evaporated or sublimated.

When the alloys and the compounds have greatly different evaporation temperatures, the concentrations of the added or doped substances may be preferably controlled by simultaneously heating a plurality of boats corresponding to a plurality of vapor deposition sources and individually controlling the boats. For example, a layer, in which amorphous selenium doped with 10% of As is doped with 5000 ppm of LiF, may be formed by containing $As_2Se_3$, amorphous selenium, and LiF in boats, respectively, setting the boat of $As_2Se_3$ to 340° C., the boat of amorphous selenium (a-Se) to 240° C., and the boat of LiF to 800° C., and opening and closing the shutters of the respective boats.

<Under Coating Layer>

The under coating layer 550 may be formed between the reading photoconductive layer 546 and the lower electrode (charge collection electrode) 520. When the electrode interface layer (crystallization prevention layer (A layer)) 548 is employed, the under coating layer 550 is preferably formed between the electrode interface layer 548 and the lower electrode 520. It is preferable that the under coating layer 550 has rectifying characteristics from the view point of a dark current and the reduction of a leak current. The under coating layer 550 preferably has an electron blocking property when a positive bias is applied to the upper electrode 518 and preferably has a hole blocking property when a negative bias is applied to the upper electrode 518.

It is preferable that the under coating layer has a resistivity of $10^8$ Ωcm or more and a film thickness of 0.01 μm to 10 μm. The layer having the electron blocking property, that is, the electron injection blocking layer is preferably a layer, which is composed of a composition of $Sb_2S_3$, SbTe, ZnTe, CdTe, SbS, AsSe, $As_2S_3$ or an organic polymer layer. A hole transport polymer such as PVK or a film composed of an insulation polymer such as polycarbonate, polystyrene, polyimide, polycycloolefin mixed with NPD, TPD is preferably used as the organic polymer layer.

A film of CdS, $CeO_2$ or an organic polymer layer is preferable as the layer having the hole blocking property, that is, as the hole injection blocking layer. A film, which is composed of an insulation polymer such as polycarbonate, polystyrene, polyimide, polycycloolefin mixed with carbon clusters of C60 (fullerene), C70 may be preferably used as the organic polymer layer.

A thin insulation polymer layer may be also preferably used, and parylene, polycarbonate, PVA, PVP, PVB, a polyester resin and an acrylic resin such as polymethylmethacrylate are preferable. A film thickness at the time is preferably 2 μm or less and more preferably 0.5 μm or less.

<Upper Coating Layer>

The upper coating layer 552 may be formed between the recording photoconductive layer 542 and the upper electrode (voltage application electrode) 518. When the electrode interface layer (crystallization prevention layer (C layer)) 548 is employed, the upper coating layer 552 is preferably formed between the electrode interface layer 548 and the upper electrode 518. It is preferable that the upper coating layer 552 has the rectifying characteristics from the view point of the dark current and the reduction of the leak current.

The upper coating layer 552 preferably has the hole blocking property when the positive bias is applied to the upper electrode 518 and preferably has the electron blocking property when the negative bias is applied to the upper electrode 518. It is preferable that the upper coating layer has a resistivity of $10^8$ Ωcm or more and a film thickness of 0.01 μm to 10 μm.

The layer having the electron blocking property, that is, the electron injection blocking layer is preferably a layer, which is composed of a composition of $Sb_2S_3$, SbTe, ZnTe, CdTe, SbS, AsSe, $As_2S_3$ or an organic polymer layer. A hole transport polymer such as PVK or a film composed of an insulation polymer such as polycarbonate, polystyrene, polyimide, polycycloolefin mixed with NPD, TPD is preferably used as the organic polymer layer.

A film of CdS, $CeO_2$ or an organic polymer layer is preferable as the layer having the hole blocking property, that is, as the hole injection blocking layer. A film, which is composed of an insulation polymer such as polycarbonate, polystyrene, polyimide, polycycloolefin mixed with carbon clusters of C60 (fullerene), C70 may be preferably used as the organic polymer layer.

A thin insulation polymer layer may be also preferably used, and parylene, polycarbonate, PVA, PVP, PVB, a polyester resin and an acrylic resin such as polymethylmethacrylate are preferable. A film thickness at the time is preferably 2 μm or less and more preferably 0.5 μm or less.

Next, the upper electrode 518 and a surface protection layer 554 formed on the surface of the upper electrode 518 will be explained.

<Upper Electrode>

A metal thin film is preferably used as the upper electrode 518 formed on the upper surface of the recording photoconductive layer 542. It is sufficient to form the upper electrode 518 with a metal such as Au, Ni, Cr, Au, Pt, Ti, Al, Cu, Pd, Ag, Mg, MgAg 3-20% alloy, a Mg—Ag intermetal compound, MgCu 3-20% alloy, Mg—Cu intermetal compound.

In particular, Au, Pt, and the Mg—Ag intermetal compound are preferably used. When, for example, Au is used, the thickness of the upper electrode 518 is preferably 15 nm or more to 200 nm or less and more preferably 30 nm or more to 100 nm or less. When, for example, the MgAg3-20% alloy is used, the thickness of the upper electrode 518 is preferably 100 nm or more to 400 nm or less.

Although the upper electrode 518 may be made by any optional method, it is preferably made by vapor deposition employing a resistance heating system. For example, after a metal ingot is melted in a boat by the resistance heating system, a shutter is opened, the metal is vapor-deposited for 15 seconds, and then cooled once. The upper electrode 518 may be formed by repeating the vapor deposition a plurality of times until the resistance value thereof is sufficiently lowered.

<Surface Protection Layer>

A high voltage of several kilovolts is applied to the upper electrode 518 to form a latent image to a radiation detecting device by radiation thereto. When the upper electrode 518 is exposed to the atmosphere, creeping discharge may be generated. To prevent the creeping discharge in the upper electrode 518, the surface protection layer 554 is formed on the upper surface of the electrode and subjected to an insulation treatment.

Since the insulation treatment must provide an electrode surface with a structure which entirely prevents the electrode surface from being in contact with the atmosphere, the electrode surface is closely covered with an insulating member. Further, the insulating member must have insulation breakdown strength exceeding the applied voltage. Furthermore, the insulating member must be a member which does not prevent transmission of the radiation in view of the function of the radiation detector. It is preferable to use an insulation polymer as materials for satisfying the required covering property, insulation breakdown strength, and high radiation transmittance. The insulation polymer is vapor-deposit or the insulation polymer solvent is coated for the insulation treatment.

Exemplified as a specific example of the manufacturing method is to form a layer with a room-temperature setting type epoxy resin, a polycarbonate resin, a polyvinyl butyral resin, a polyvinyl alcohol resin, an acrylic resin, and a polyparaxylylene derivative by a CVD method. A method of forming a layer with the room-temperature setting type epoxy resin and the polyparaxylylene derivative by the CVD method is preferable and the method of forming a layer with the polyparaxylylene derivative by the CVD method is especially preferable. A preferable film thickness is 10 μm or more to 1000 μm or less, and a more preferable film thickness is 20 μm or more to 100 μm or less.

An insulation film having a very high unevenness covering property may be obtained from a polyparaxylylene film without applying thermal stress to a member to be covered with the film because the polyparaxylylene film may be formed at a room temperature. However, since the polyparaxylylene film is chemically stable, the close contact property thereof with the member to be covered with the film is ordinarily not good in many cases. There are ordinarily known a physical treatment and a chemical treatment using a coupling agent, corona discharge, a plasma treatment, ozone rinse, an acid treatment, surface roughing as a treatment applied to the member to be covered with the film before the polyparaxylylene film is formed to improve the close contact property of the film with the member to be covered with the film, and these treatments may be used. In particular, a preferable method for improving the close contact property of the polyparaxylylene film with the member to be covered with the film is to form the polyparaxylylene film after a silane coupling agent or a silane coupling agent diluted with alcohol as necessary is applied to at least the portion where it is desired to improve the close contact property of the portion with the member to be covered with the film.

Further, it is preferable to perform a vapor proof treatment to prevent the time degradation of the radiation detecting device. Specifically, the radiation detecting device is covered with a vapor proof member. A simple resin such as the insulation polymer does not have a sufficient function as the vapor proof member, and an arrangement having at least an inorganic material layer composed of a glass, an aluminum laminate film may be effectively used. However, since the glass attenuates transmission of radiation, the vapor proof member is preferably a thin aluminum laminate film. There is, for example, a vapor proof member laminated with PET 12 μm/rolled aluminum 9 μm/nylon 15 μm which is generally used as a vapor proof packing material.

The thickness of aluminum is preferably 5 μm or more to 30 μm or less, the thickness of PET and the thickness of nylon on and under the aluminum are preferably 10 μm or more to 100 μm or less, respectively. Since the attenuation of the film caused by X-rays is about 1%, the film is optimum to satisfy both a vapor proof effect and transmission of X-rays.

Figure 13:
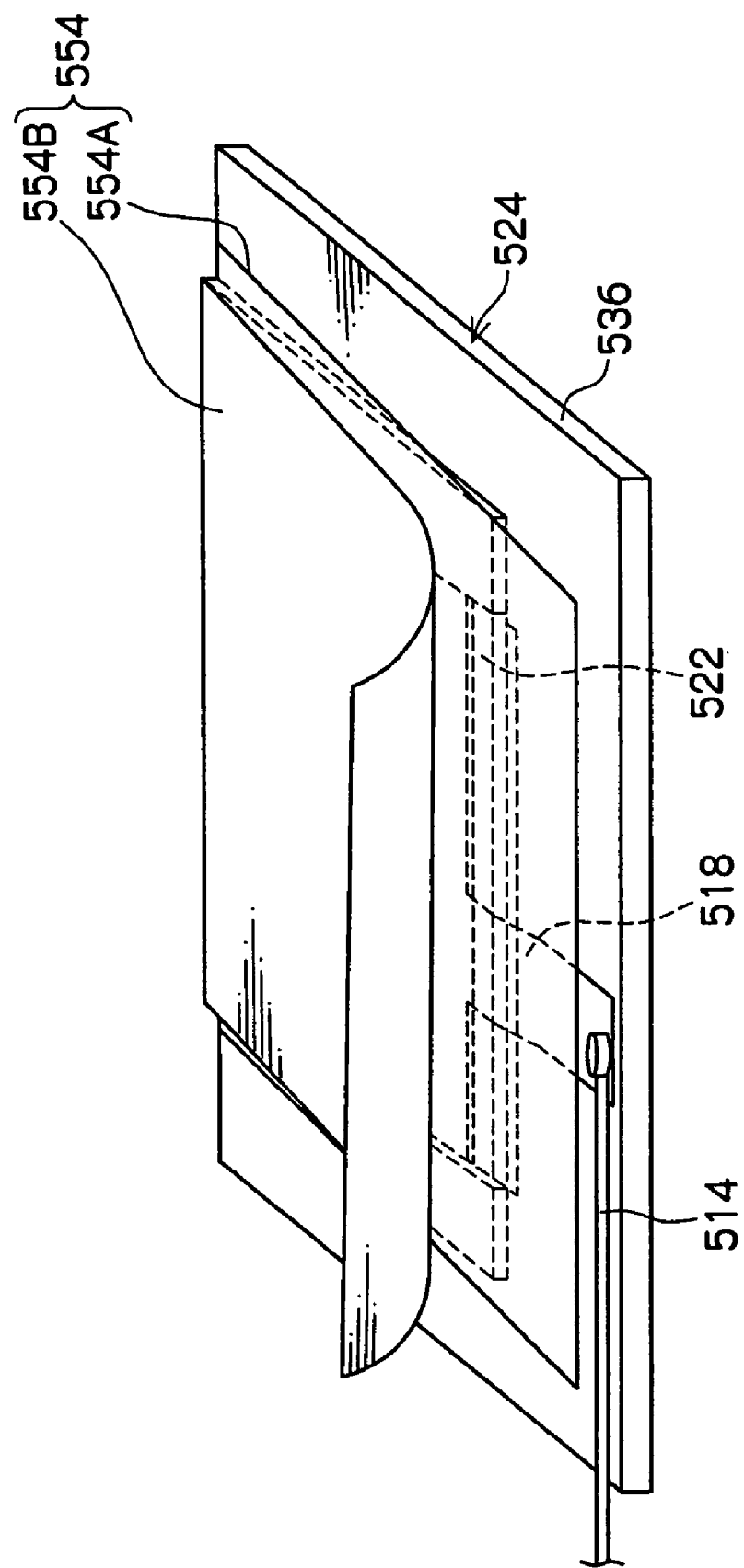
FIG. 13 is a view showing a hermetic seal structure for closely sealing an upper electrode of the radiation detecting substrate shown in FIGS. 10A and 10B.

As shown in, for example, FIG. 13, the overall surface of the radiation detector, which is subjected to an insulation treatment by a polyparaxylylene 554A, is covered with a vapor proof film 554B, and the periphery of the vapor proof film 554B is bonded and fixed to a substrate by an bonding agent outside of the region of the radiation detection device. With this arrangement, the radiation detection device may be closely sealed by the substrate and the vapor proof film 554B.

When the periphery of the vapor proof film 554B is bonded and fixed to the substrate, since the polyparaxylylene 554A is very stable chemically, the bonding property thereof to other member by a bonding agent is generally poor. However, the bonding property of the polyparaxylylene 554A may be improved by radiating ultraviolet rays thereto before it is bonded. Although a necessary radiation time is optimized depending on the wavelength and the number of watts of the ultraviolet rays to be used, a low-pressure mercury lamp of 1 W to 50 W is preferably used and preferably radiates light from 1 minute to 30 minutes.

Note that the radiation detection device according to the exemplary embodiment uses the amorphous selenium. Since there is a possibility that a function for forming a latent image may not be obtained at a high temperature of 40° C. or more because the amorphous selenium is crystallized, it is not suitable to heat the device when it is bonded. To cope with the above problem, the room-temperature setting type bonding agent is preferably used, and two-liquid mixing room-temperature setting type epoxy bonding agent having high strength is most suitably used. The epoxy bonding agent is applied to the outer periphery of the radiation detecting device and covered with the vapor proof film 554B. A bonding portion is uniformly pressed and fixed from the upper surface of the vapor proof film 554B and left in this state for 12 hours or longer in a room temperature environment to set the bonding agent. After the bonding agent is set, it is released from the pressed state, thereby a closely seal structure is completed.

A closely sealed structure member will be supplementally explained. When the radiation detection device is used for mammography, it is desired to take an image in a small radiation dose to suppress exposure to X-rays. To detect a change of shade in the small radiation dose, it is preferable to increase the transmittance of X-rays of the members in the path from a radiation source to the device excluding a patient (breast), thereby a clear image may be obtained.

FIG. 13 shows an example of a preferable protection layer and a preferable closely seal structure, the invention is not limited thereto. It is preferable to keep the moisture environment of the device to 30% or less and it is more preferable to keep the moisture environment thereof to 10% or less by forming the protection film.

Although examples of preferable layer arrangements will be shown below, the invention is not limited thereto. FIG. 12 shows a model view of the cross section of the layer arrangements.

<Arrangement 1>

As shown in FIGS. 10B and 11A, a layer arrangement was created on the lower radiation detecting substrate 524 in the following sequence. A flat IZO electrode having a surface roughness Ra<1 nm was used as the lower electrode 520.

Under coating layer 550: $CeO_2$, thickness: 20 nm

Under electrode interface layer 548: amorphous selenium doped with As of 10% and 500 ppm of LiF, thickness: 0.1 μm Reading photoconductive layer 546: amorphous selenium, thickness: 7 μm Charge accumulation layer 544: $As_2Se_3$, thickness: 1 μm Recording photoconductive layer 542: amorphous selenium containing 0.001 ppm of Na, thickness: 200 μm Upper electrode interface layer 548: amorphous selenium doped with 10% of As, thickness: 0.2 μm Upper coating layer 552: $Sb_2S_3$, thickness: 0.5 μm Upper electrode 518: Au, thickness: 70 nm <Arrangement 2>

As shown in FIGS. 10B and 1A, a layer arrangement was created on the lower radiation detecting substrate 524 in the following sequence. A flat IZO electrode having a surface roughness Ra<1 nm was used as the lower electrode 520.

Under coating layer 550: nil

Under electrode interface layer 548: amorphous selenium doped with 3% of As, thickness: 0.15 μm Reading photoconductive layer 546: amorphous selenium, thickness: 15 μm Charge accumulation layer 544: $As_2Se_3$, thickness: 2 μm Recording photoconductive layer 542: amorphous selenium containing 0.001 ppm of Na, thickness: 180 μm Upper electrode interface layer 548: amorphous selenium doped with 10% of As, thickness: 0.1 μm Upper coating layer 552: $Sb_2S_3$, thickness: 0.2 μm Upper electrode 518: Au, thickness: 150 nm <Arrangement 3>

As shown in FIGS. 10B and 11A, a layer arrangement was created on the lower radiation detecting substrate 524 in the following sequence. A flat IZO electrode having a surface roughness Ra<1 nm was used as the lower electrode 520.

Under coating layer 550: $CeO_2$, thickness: 30 nm

Lower electrode interface layer 548: amorphous selenium doped with 6% of As, thickness: 0.25 μm Reading photoconductive layer 546: amorphous selenium, thickness: 10 μm Charge accumulation layer 544: $As_2Se_3$, thickness: 0.6 μm Recording photoconductive layer 542: amorphous selenium containing 0.001 ppm of Na, thickness: 230 μm Upper electrode interface layer 548: amorphous selenium doped with 10% of As, thickness: 0.3 μm Upper coating layer 552: $Sb_2S_3$, thickness: 0.3 μm Upper electrode 518: Au, thickness: 100 nm <Charge Output Amplifier>

Figure 14:
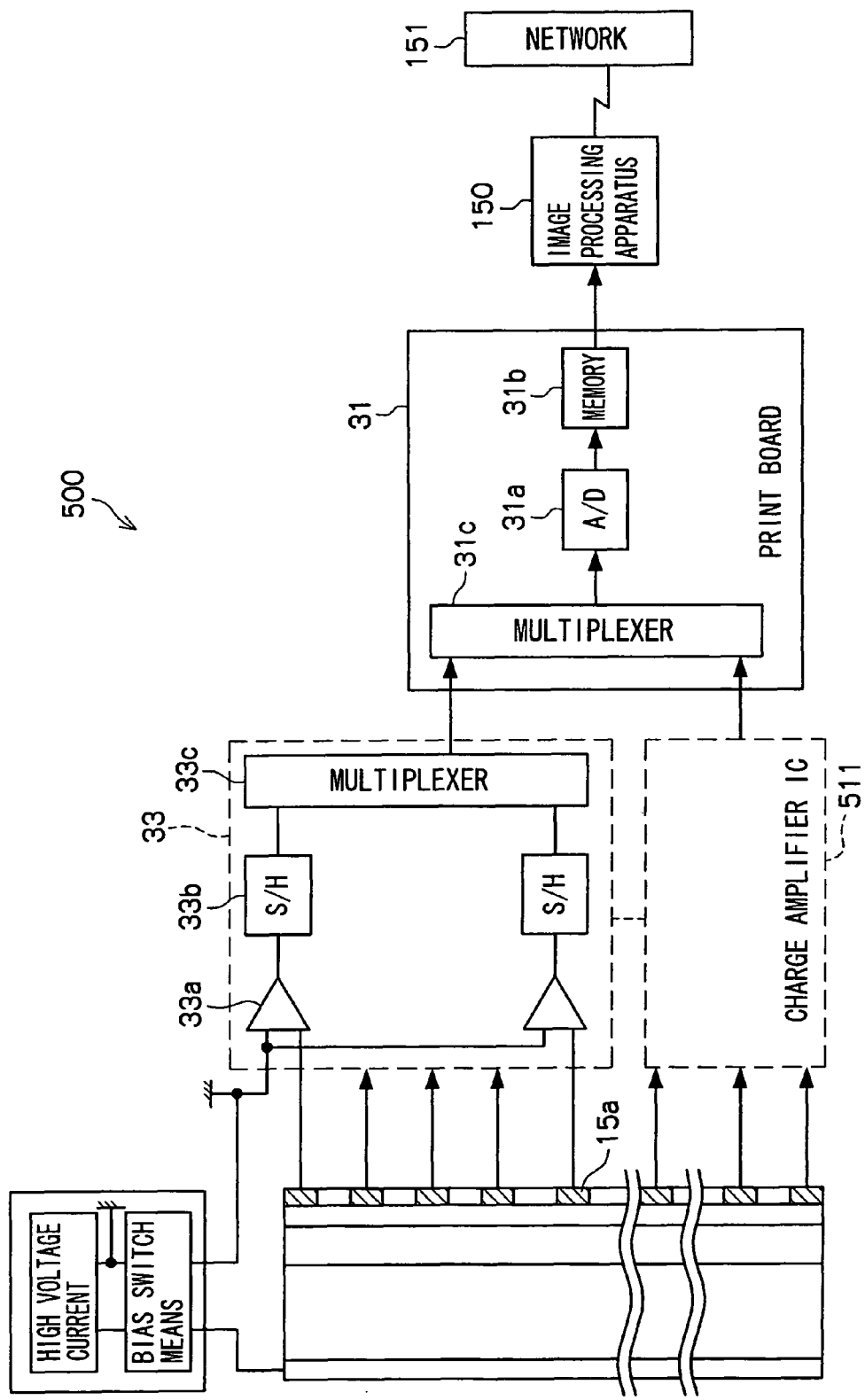
FIG. 14 is a block diagram showing an arrangement of a charge output amplifier and a connection mode of the amplifier to an image processing apparatus, disposed in the portion outside of the radiation detecting substrate.

In the exemplary embodiment, charges are subjected to AD conversion after they are amplified by an amplifier. FIG. 14 is a block diagram showing an arrangement of the charge output amplifier and how an image processing apparatus 150 disposed outside of the radiation detecting substrate 500 are connected to the charge taking-out amplifier.

A charge amplifier IC 511 as the charge output amplifier has a multiplicity of charge amplifiers 33a connected to each of elements 15a of the radiation detecting substrate 500, sample holds (S/H) 33b, and a multiplexer 33c for multiplexing the signals from the respective sample holds 33b.

The current, which flows out from the lower electrode, is converted into voltages by the respective charge amplifiers 33a, the voltages are sample-held by the sample holds 33b at predetermined timing, and the sample-held voltages corresponding to the respective elements 15a are sequentially output from the multiplexer 33c so that they are sequentially switched in the sequence in which the elements 15a are disposed (corresponding to a part of a main scan).

The signals sequentially output from the multiplexer 33c are input to a multiplexer 31c disposed on a print substrate 31 and further sequentially output from the multiplexer 31c so that the voltages corresponding to the respective elements 15a are switched in the sequence in which the elements 15a are disposed, thereby the main scan is completed.

The signals sequentially output from the multiplexer 31c are converted into digital signals by an A/D conversion unit 31a and stored in a memory 31b. The image signals, which are stored in the memory 31b once, are sent to the external image processing device 150 through a signal cable, subjected to appropriate image processing in the image processing device 150, uploaded to a network 151 together with radiographic information, and sent to a server or a printer.

<Image Acquisition Sequence>

Figure 15:
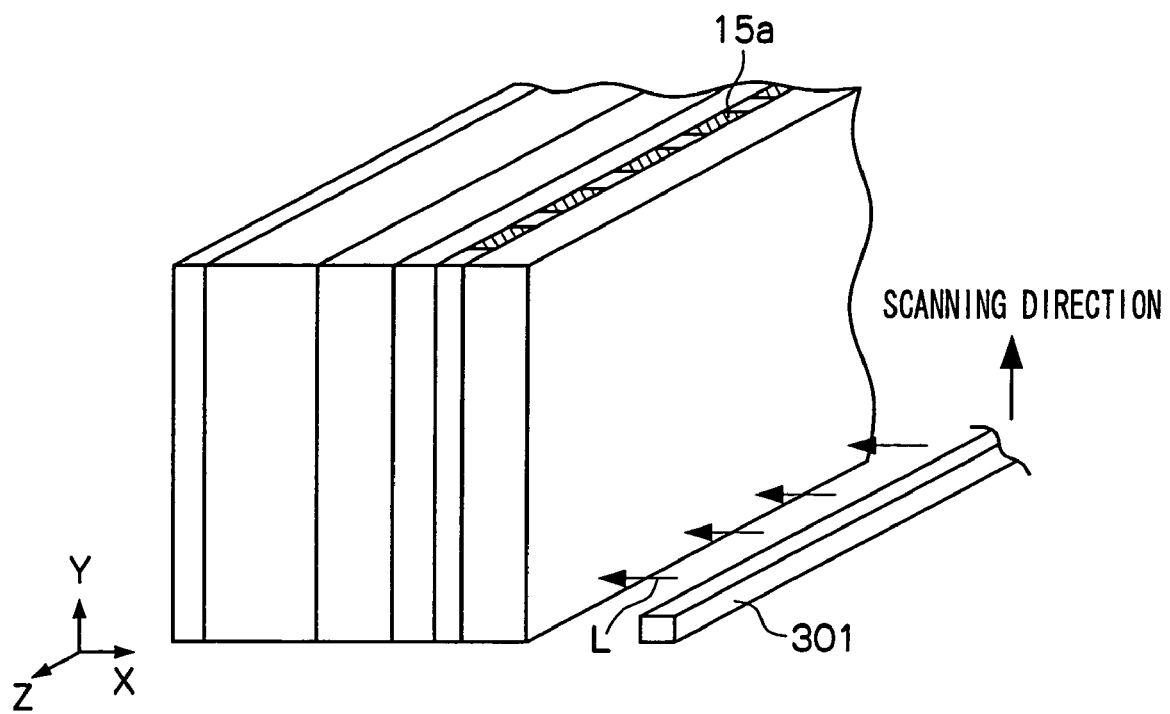
FIG. 15 is a schematic view showing a scan performed by line light as reading light.

An image formation sequence of an image recording/reading system is basically composed of a process for accumulating latent image charges by radiating recording light (for example, X-rays) while a high voltage is applied and a process for reading out the latent image charges by radiating reading light after the application of the high voltage is completed. Although the reading light L is most optimally radiated by a method of scanning a line light source 301 in an electrode direction (refer to FIG. 15), another method may be also employed.

Further, a process for sufficiently erasing the latent image charges which are left without being read may be combined with the above process when necessary. The erasure process is performed by radiating erasure light to the entire surface of a panel. In this case, the light may be radiated to the entire surface of the panel at a time or the entire surface may be scanned with line light or spot light, and these process are performed after the reading process or/and the latent image accumulation process are performed. When the erasure light is radiated, erasure efficiency may be increased in combination with the application of the high voltage. Further, the charges (dark current charges), which are generated by the dark current when the high voltage is applied, may be erased by performing "pre-exposure" before the recording light is radiated after the high voltage is applied.

Further, it is known that various charges are also accumulated to an electrostatic recording member by reasons other than the above ones before the recording light is radiated. Since these remaining signals affect the image information signal to be output next as a remaining image phenomenon, it is preferable to reduce them by correction.

A method of adding a remaining image reading process to the above image recording/reading process is effective for correcting the remaining image signal. The remaining image recording process is performed by reading a "remaining image" by the reading light after only the high voltage is applied without radiating the recording light, and the remaining image signal may be corrected by subtracting the "remaining image" signal from the "recording image" signal after the "remaining image" signal is subjected to appropriate processing. The remaining image reading process is performed before or after the image recording/reading process. Further, an appropriate erasure process may be combined before or/and after the remaining image reading process.

In the radiation detecting substrate 500 as the radiation detector using the optical reading system, the upper electrode 518 corresponds to the upper electrode of the invention, the radiation detecting layer 522 corresponds to the charge conversion layer according to the invention, and the lower electrode 520 corresponds to the lower electrode according to the invention. Further, the lower radiation detecting substrate 524 corresponds to the substrate according to the invention, and the high voltage wiring 514 corresponds to the conductor according to the invention.

The radiation detecting substrate 500 using the optical reading system may be arranged as shown below likewise the arrangement shown in FIG. 1.

Figure 16:
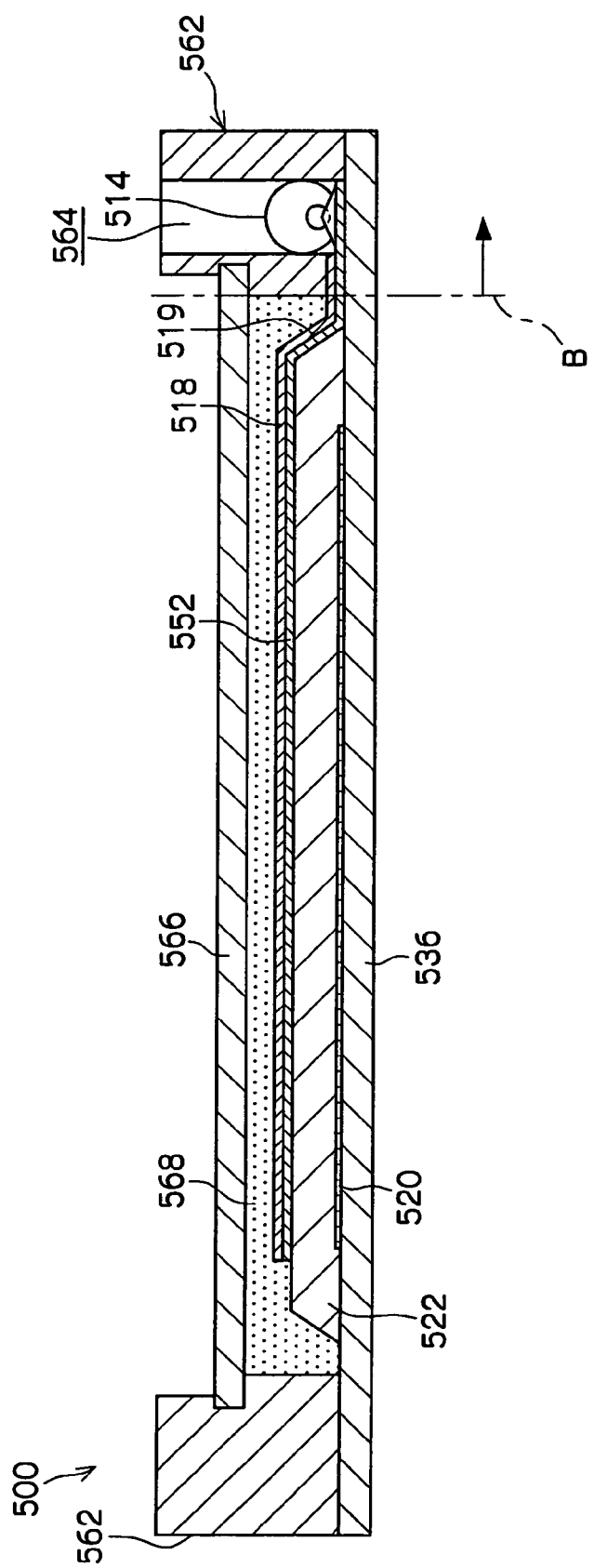
FIG. 16 is a view showing an example in which an arrangement for covering a radiation detecting layer and an arrangement for electrically connecting a high-voltage wire to an upper electrode are applied in the radiation detecting substrate shown in FIGS. 10A and 10B likewise the radiation detector using the electric reading system shown in FIG. 1.

As shown in FIG. 16, a cover glass 566 is disposed above the upper electrode 518 as an example of a cover member covering the upper electrode 518.

A protection member 562, to which the cover glass 566 is joined, is disposed to the glass substrate 536. The protection member 562 stands on the outer periphery of the glass substrate 536 and surrounds a predetermined region including the radiation detecting layer 522 from four sides. That is, the predetermined region is partitioned by the protection member 562 for surrounding the periphery.

Further, the space which is surrounded by the cover glass 566, the protection member 562, and the glass substrate 536 (predetermined region partitioned by the protection member 562), is filled with a thermosetting resin 568 as a filling member. Further, a space 564 having an upper open portion is formed to one side of the four sides of the protection member 562.

As shown in FIG. 16, the extended electrode 519 extends from the upper electrode 518 to outside of the inner wall of protection member 562, that is, to outside of the predetermined region partitioned by the protection member 562.

The extended electrode 519 projects from a side of the upper electrode 518 and is pulled down up to the glass substrate 536 along the side surface inclining downward of the radiation detecting layer 522.

Further, the extended electrode 519 extends to the region where the radiation detecting layer 522 does not exist on the glass substrate 536 and is extended up to the space 564 in the protection member 562.

The extended electrode 519 is electrically connected to the high voltage wiring 514 in the space 564 in the protection member 562 which is the region where the radiation detecting layer 522 does not exist on the glass substrate 536. The high voltage wiring 514 is a conductor for applying a bias voltage to the radiation detecting layer 522 from the upper electrode 518 through the extended electrode 519.

Note that the members and the materials, which are used in the radiation detector using the optical reading system, may be applied to the corresponding portions of the radiation detector using the electric reading system having the same functions. The invention is not limited to the above exemplary embodiment and may be variously modified, changed, and improved.

A radiation detector of an aspect of the invention includes a charge conversion layer that generates charges in response to radiation incident thereon, a substrate disposed under the charge conversion layer and having a lower electrode that collects the charges generated by the charge conversion layer, a protection member projecting from the outer periphery of the substrate and surrounding the charge conversion layer, an upper electrode layered on the charge conversion layer that applies a bias voltage to the charge conversion layer, an extended electrode extending from the upper electrode to a portion outside of the inner wall of the protection member, the inner wall being located on the charge conversion layer side when viewed in a cross section, and a conductor electrically connected outside of the inner wall to the extended electrode that applies a bias voltage from the extended electrode to the charge conversion layer through the upper electrode.

According to the above aspect, the extended electrode is extended from the upper electrode to the portion outside of the inner wall of the protection member, and the bias voltage is applied from the extended electrode to the charge conversion layer through the upper electrode by the conductor electrically connected to the extended electrode. The charge conversion layer generates the charges in response to the radiation incident thereon. The charges generated by the charge conversion layer are collected by the lower electrode.

Note that the charges generated by the charge conversion layer include the charges indirectly generated by the charge conversion layer in addition to the charges directly generated by the charge conversion layer, for example, the charge that is generated corresponding to the charges that is directly generated by the charge conversion layer.

The extended electrode is electrically connected to the conductor at the portion outside of the inner wall of the protection member. The inner wall among the protection member is provided at the charge conversion layer side when viewed in a cross section. As a result, when it is compared with the configuration in which the extended electrode is connected to the conductor above the charge conversion layer, the pressure applied to the charge conversion layer is reduced, and deterioration of the charge conversion layer may be suppressed.

Further, the extended electrode is electrically connected to the conductor in the portion outside of the inner wall of the protection member, a connection work of the extended electrode to the conductor may be performed in the state that the charge conversion layer is surrounded by the protection member, thereby deterioration of the charge conversion layer may be suppressed even while the connection work is performed.

In the above aspect, the conductor may be disposed in the protection member and may be electrically connected to the extended electrode in the protection member.

When the conductor is connected to the extended electrode in a portion outside of the protection member, an additional member is necessary to cover the connecting portion for connecting the conductor to the extended electrode in order to secure insulation property thereof. In the above aspect, however, since they are connected to each other in the protection member, the joint portion of the conductor with the extended electrode is covered with the protection member, thereby an increase of the number of parts may be suppressed.

In the above aspect, the protection member may be an insulating member having an insulation property.

According to the aspect, since the protection member is the insulating member having the insulation property, it may secure the insulation property of the joint portion between the conductor and the extended electrode.

The above aspect may be provided with an intermediate member formed between the substrate and the extended electrode that maintains a predetermined interval between the substrate and the extended electrode.

According to the aspect, since the intermediate member maintains the predetermined interval between the substrate and the extended electrode, the insulation property between the extended electrode and a lower electrode formed at the substrate may be secured.

The above aspect may be provided with an intermediate layer formed from between the charge conversion layer and the upper electrode to between the extended electrode and the substrate that increases the joining strength of the extended electrode to the substrate.

According to the aspect, the intermediate layer that increases the joining strength between the extended electrode and the substrate is formed from between the charge conversion layer and the upper electrode to between the extended electrode and the substrate. Accordingly, when the above configuration is compared with the arrangement in which a member that increases the joining strength between the extended electrode and the substrate is formed from between the extended electrode and the substrate to a portion below the charge conversion layer, the configuration of the present aspect may suppress the creeping discharge from the extended electrode to the lower electrodes and may secure the insulation property to the lower electrode disposed under the charge conversion layer.

The above aspect may be provided with a cover member disposed on the upper electrode and having an outer periphery joined to the protection member, wherein the joint portion of the cover member which is joined with the protection member is disposed in a location where the charge conversion layer is not disposed on the substrate when viewed in a cross section, and a filling member that fills the portion between the cover member and the upper electrode.

According to the aspect, since the joint portion of the cover member which is joined with the protection member is disposed to the location where the charge conversion layer is not formed, the stress generated in the joint portion of the cover member with the protection member is prevented from transmitting to the charge conversion layer through the filling member. With this arrangement, the pressure received by the charge conversion layer may be reduced and deterioration of the charge conversion layer may be suppressed.

Since the present aspects are arranged as described above, the deterioration of the charge conversion layer may be suppressed.

What is claimed is:

1. A radiation detector comprising:
    a charge conversion layer that generates charges in response to radiation incident thereon;
    a substrate disposed under the charge conversion layer and having a lower electrode that collects the charges generated by the charge conversion layer;
    a protection member projecting from the outer periphery of the substrate and surrounding the charge conversion layer;
    an upper electrode layered on the charge conversion layer that applies a bias voltage to the charge conversion layer;
    an extended electrode extending from the upper electrode to a portion outside of an inner wall of the protection member, the inner wall being located on the charge conversion layer side when viewed in a cross section;
    a conductor electrically connected outside of the inner wall to the extended electrode that applies a bias voltage from the extended electrode to the charge conversion layer through the upper electrode; and
    an intermediate layer formed from between the charge conversion layer and the upper electrode to between the extended electrode and the substrate, wherein the intermediate layer increases the joint force between the extended electrode and the substrate and wherein the intermediate layer comprises a charge injection blocking layer.

2. The radiation detector according to claim 1, wherein the conductor is disposed in the protection member and is electrically connected to the extended electrode in the protection member.

3. The radiation detector according to claim 1, wherein the protection member is an insulating member having an insulation property.

4. The radiation detector according to claim 1, further comprising an intermediate member formed between the substrate and the extended electrode that maintains a predetermined interval between the substrate and the extended electrode.

5. The radiation detector according to claim 1 further comprising:
a cover member disposed above the upper electrode and having an outer periphery joined to the protection member, wherein a joined portion of the cover member which is joined with the protection member is disposed in a location where the charge conversion layer is not disposed on the substrate when viewed in a cross section; and
a filling member that fills a portion between the cover member and the upper electrode.

* * * * *